United States Patent
Kreimer et al.

(10) Patent No.: US 12,132,817 B2
(45) Date of Patent: Oct. 29, 2024

(54) METHODS FOR PROTECTING COMPUTER HARDWARE FROM CYBER THREATS

(71) Applicant: FORTIFYIQ, INC., Newton, MA (US)

(72) Inventors: Ury Kreimer, Tekoa (IL); Alexander Kesler, Newton, MA (US); Vadim Bugaenko, Nokdim (IL); Yaacov Belenky, Maale Adumim (IL)

(73) Assignee: FORTIFYIQ, INC., Newton, MA (US)

( * ) Notice: Subject to any disclaimer, the term of this patent is extended or adjusted under 35 U.S.C. 154(b) by 184 days.

(21) Appl. No.: 17/861,445

(22) Filed: Jul. 11, 2022

(65) Prior Publication Data

US 2022/0360426 A1 Nov. 10, 2022

Related U.S. Application Data

(63) Continuation of application No. 17/422,884, filed as application No. PCT/IL2020/050074 on Jan. 16, 2020, now Pat. No. 11,418,317.

(60) Provisional application No. 62/939,699, filed on Nov. 25, 2019, provisional application No. 62/793,412, filed on Jan. 17, 2019.

(51) Int. Cl.
*H04L 9/00* (2022.01)
*H04L 9/06* (2006.01)

(52) U.S. Cl.
CPC ............ *H04L 9/003* (2013.01); *H04L 9/0618* (2013.01); *H04L 9/0643* (2013.01); *H04L 2209/04* (2013.01)

(58) Field of Classification Search
CPC ..... H04L 9/003; H04L 9/0618; H04L 9/0643; H04L 2209/04; G09C 1/00
See application file for complete search history.

(56) References Cited

U.S. PATENT DOCUMENTS

| | | |
|---|---|---|
| 9,531,384 B1 * | 12/2016 | Morrison ............ H03K 19/0019 |
| 2003/0135530 A1 | 7/2003 | Parthasarathy et al. |
| 2005/0259814 A1 * | 11/2005 | Gebotys ................ H04L 9/0618 380/28 |
| 2006/0093136 A1 | 5/2006 | Zhang et al. |
| 2007/0271323 A1 | 11/2007 | Stein et al. |
| 2010/0284539 A1 | 11/2010 | Roy et al. |

(Continued)

FOREIGN PATENT DOCUMENTS

| | | |
|---|---|---|
| WO | 2003053001 A1 | 6/2003 |
| WO | 2018015325 A1 | 1/2018 |
| WO | 2020148771 A1 | 7/2020 |

OTHER PUBLICATIONS

Patent Cooperation Treaty, "International Search Report for PCT Patent Application No. PCT/2020/050074", Mailed Date: Jun. 25, 2020, 5 pages.

(Continued)

*Primary Examiner* — Beemnet W Dada
(74) *Attorney, Agent, or Firm* — Eschweiler & Potashnik, LLC

(57) ABSTRACT

A method of improving performance of a data processor comprising: in a field of characteristic 2 computing $X^Y$ by performing a series of: (i) multiplications of two different elements of the field; and (ii) raising an element of the field to a power Z wherein Z is a power of 2; wherein the number of multiplications (i) is at least two less than the number of ones (1s) in the binary representation of Y.

4 Claims, 16 Drawing Sheets

(56) References Cited

U.S. PATENT DOCUMENTS

| | | |
|---|---|---|
| 2011/0010141 A1 | 1/2011 | Jabir |
| 2014/0208079 A1* | 7/2014 | Bradbury ............ G06F 9/30018 |
| | | 712/222 |
| 2017/0324554 A1 | 11/2017 | Tomlinson et al. |
| 2020/0226294 A1* | 7/2020 | Kim ........................ G06F 7/586 |

OTHER PUBLICATIONS

Patent Cooperation Treaty, "Written Opinion for PCT Patent Application No. PCT/2020/050074", Mailed Date: Jun. 25, 2020, 6 pages.

Wu, Huapeng et al. "Highly Regular Architectures for Finite Field Computation Using Redundant Basis", Springer-Verlag Berling Heidelberg, pp. 269-279, 1999.

Non-Final Office Action dated Mar. 1, 2022 for U.S. Appl. No. 17/422,884.

Notice of Allowance dated May 2, 2022 for U.S. Appl. No. 17/422,884.

* cited by examiner

300 process each cell in a cells library to produce a table of $2^{2n}*m$ entries, where n stands for the number of input pins of the cell, and m stands for the number of the output pins (310)

perform runtime calculation of the momentary power consumption caused by a glitch using the current state of a gate level netlist as an input (320)

receive a cells library (410)

process cells library to produce program code (420)

800 receive at least one of a synthesized gate level netlist, a cells library and an RTL test bench as input(s) at a data processor (810)

generate a power consumption model that includes consumption due to short circuit, intrinsic capacity, and glitches (820)

900 manufacture a first batch of processor chips with a same function and a first design (910)

manufacture a second batch of the processor chips with the same function and a second design (920)

METHODS FOR PROTECTING COMPUTER HARDWARE FROM CYBER THREATS

CROSS-REFERENCE TO RELATED APPLICATIONS

This application is a continuation of U.S. Ser. No. 17/422,884 filed on Jul. 14, 2021 having the same title as the present application which was a national stage application under 35 U.S.C. § 371 of PCT/IL2020/050074 filed on 16 Jan. 2020, which claimed the benefit according to 35 U.S.C. § 119 (e) of U.S. provisional application 62/793,412 filed on Jan. 17, 2019 and having the same title as the present application; and claimed the benefit according to 35 U.S.C. § 119 (e) of U.S. provisional application 62/939,699 filed on Nov. 25, 2019 and having the same title as the present application; and each of these earlier applications is fully incorporated herein by reference.

FIELD OF THE INVENTION

The invention is in the field of hardware security

BACKGROUND OF THE INVENTION

Side Channel Attacks (SCA) such as differential power analysis (DPA), simple power analysis (SPA), and fault injection are a common category of cyber-attack used by hackers and intelligence agencies to penetrate sensitive systems in order to perform cryptographic key extraction.

Any device that performs a cryptographic operation should withstand side channel attacks and several security certifications explicitly require such side channel attack resistance tests.

Many available methods to evaluate the level of protection of a given device against various forms of SCA require production of the device prior to testing.

Another common type of cyber-attack is differential fault analysis (DFA). DFA is a type of side channel attack in the field of cryptography or cryptanalysis. DFA induces faults (e.g. unexpected environmental conditions) into cryptographic implementations, to reveal their internal states.

A block cipher is a deterministic algorithm operating on fixed-length groups of bits, called "blocks", with an unvarying transformation that is specified by a symmetric key. In many block ciphers, a block is defined as a fixed number of bits (e.g. 128 bits) and the block is divided into bytes containing a fixed number of bits (e.g. 8 bits). Within a block, the fundamental unit operated upon for encryption (coding) is a byte, e.g. 8 bits.

In various block cipher systems, the size of a block and/or a byte varies.

IP Cores are prebuilt cells for integration into an existing system-on-chip (SOC). SCA attacks can extract cryptographic keys from target hardware—thus making the hardware unsecure—by analyzing, for example, its power outputs and/or electromagnetic emission (traces) along with data samples.

SUMMARY OF THE INVENTION

A broad aspect of the invention relates to decreasing vulnerability of hardware components to various forms of cyber-attacks.

One aspect of some embodiments of the invention relates to protection of hardware components (e.g. semiconductor chips) from attacks based on differential power analysis (DPA). In some exemplary embodiments of the invention, testing of a chip at the design stage (i.e. via a power consumption (PC) simulator and a trace analyzer) contributes to a decrease in vulnerability to DPA attacks and/or contributes to an increase in efficiency of product development. According to various exemplary embodiments of the invention, testing of a chip at the design stage employs a synthesized gate level netlist and/or a cells library and /or an RTL testbench as an input.

For purposes of this specification and the accompanying claims, the term "cells library" includes all libraries in "SYNOPSIS Liberty Format", "ACCELLERA consortium Advanced Library Format (ALF)" and any functional equivalent.

In some exemplary embodiments of the invention, the simulator processes the cells library to produce program code (e.g. C++ code) that implements a power consumption model and/or program code that simulates the behavior of each cell type. Alternatively, or additionally, in some embodiments the simulator includes a netlist parser and a simulator driver.

Another aspect of some embodiments of the invention relates to a method to check whether the power consumption due to glitches could be used, during an attack, to reveal a secret encryption key (coding key). For purposes of this specification and the accompanying claims, the term "glitch" indicates the effect of the volatility of electrical current before it stabilizes at a clock boundary that causes unpredicted power consumption of the device.

In some embodiments of the invention momentary glitch simulation is performed locally. This provides an efficient alternative to calculating exact power consumption caused by glitches which would need to take into account signals propagation in space as a function of time. Thus, according to this aspect, it is sufficient to simulate momentary glitches to see if an attack that uses this information is likely to succeed. In some embodiments, the simulation includes two stages: using information from a cells library to preprocess each cell, and runtime calculation of the momentary power consumption caused by a glitch in each cell.

A third aspect of some embodiments of the invention relates to processing the cells library to produce program code that implements a power consumption model and/or program code that simulates the behavior of each cell type. Alternatively, or additionally, in some embodiments the simulator includes a netlist parser and the test vectors driver. In some embodiments the program code is in C++.

A fourth aspect of some embodiments of the invention relates to verification of hardware design against differential fault analysis (DFA). In some embodiments, the user provides a list of records as an input. In some embodiments a predefined list of records is provided for known fault injection attacks so that the user does not need to provide it as an input. According to these embodiments, the records describe where and how intervention into the normal execution of the design is done. In some embodiments, each record includes a gate name, a name of a pin where a signal is swapped and a timing for swapping. In some exemplary embodiments of the invention, the current state of the network of gates is stored in memory during the simulation and at the right time, the required intervention to the execution is produced. In some embodiments if the design does not halt as a result of the injection a weakness is reported.

A fifth aspect of some embodiments of the invention relates to use of Galois Field transformations (GF) to increase a level of difficulty in ascertaining an encryption key in block cipher coding.

A sixth aspect of some embodiments of the invention relates to a method of using Galois Field (GF) transformation matrices to increase a level of difficulty in ascertaining an encryption key in block cipher coding.

A seventh aspect of some embodiments of the invention relates to a manufacturing method in which microprocessor chips are produced in batches, with each batch having a different design but preserving a same function. In some embodiments the design differences include usage of different set of GF representations on the chip. In some exemplary embodiments of the invention, usage of different GF representations on the chip means that chips from different batches will encrypt data differently.

One of the ways to deal with side-channel attacks, called masking, is that arithmetic calculations in the field are not performed directly, but using formulas that lead to the same final result, but contain different intermediate results.

An eighth aspect of some embodiments of the invention relates to a new masking method. In some embodiments, the method includes representing each element of the field as a polynomial of degree no higher than 7+d, where d>0 is the redundancy parameter. According to these embodiments, to represent each element, 8+d bits are required (versus 8 bits in the standard implementation). Alternatively or additionally, the same field element can be represented in $2^d$ various ways (pairwise differing by terms that are multiples of the generating polynomial), and at each moment of calculations it is possible to choose any of these representations. In some embodiments, this can slightly decrease the performance of calculations, since the result of each multiplication must be reduced to a polynomial of a higher degree compared to the standard implementation (7+d instead of 7). Alternatively or additionally, this representation allows one to counteract DPA attacks by introducing disturbances in the calculation by adding multiples of the generating polynomial to the bytes (data or key) at any time during the encryption, decryption or extension of the key. This action can be applied to each byte independently, which permits volatility (and thus, resistance to attack) even with a small value of the redundancy parameter d.

A ninth aspect of some embodiments of the invention relates to sequential application of two different masks to a block cipher. In some exemplary embodiments of the invention, the first mask is not removed until after the second mask is applied. In some exemplary embodiments of the invention, the first mask is an additive mask. Alternatively or additionally, in some embodiments the second mask is a redundancy mask.

A tenth aspect of some embodiments of the invention relates to associating a checksum datum with a key. In some exemplary embodiments of the invention, the key is a cryptographic key. Alternatively or additionally, in some embodiments the key is a round key resulting from key scheduling. In some embodiments, the round key is the last round key in a set. In some embodiments, association of the checksum datum with the key contributes to a reduction in susceptibility to fault injection attacks and/or read by write attacks conducted on either cryptographic keys or on key scheduling.

An eleventh aspect of some embodiments of the invention relates to reducing the number of multiplications of two different elements of a field while computing $X^Y$ in a field of characteristic 2 in a data processor. This reduction contributes to an improvement in processing speed and/or contributes to a reduction in surface area of silicon required in the chip.

It will be appreciated that the various aspects described above relate to solution of technical problems related to assessing security of a semiconductor chip prior to production of a prototype (i.e. at the design stage).

Alternatively or additionally, it will be appreciated that the various aspects described above relate to solution of technical problems related to a level of competence required to assess security of a semiconductor chip.

Alternatively or additionally, it will be appreciated that the various aspects described above relate to solution of technical problems related to increasing a degree of difficulty associated with ascertaining a cryptographic key via hardware attacks of different types.

In some exemplary embodiments of the invention there is provided a method for simulating power consumption including:(a) receiving as inputs at a data processor a synthesized gate level netlist and a cells library; (b) preprocessing the cells library by the data processor to produce program code for behavior simulation and power consumption simulation of each cell; (c) simulating a runtime clock and for each raising and falling conditions of the clock processing the whole network of the connected gates of the gate level netlist; (d) applying the behavior simulation on cryptographic modules using the clock to process the netlist; and (e) calculating values of output pins of the cells library using the information about the cells behavior and calculating power consumption from the preprocessing to simulate a momentary power consumption. In some exemplary embodiments of the invention, the method includes receiving a testbench as an input and extracting instructions from the testbench, the instructions indicating how to automatically initialize and execute the gate level netlist. Alternatively or additionally, in some embodiments the preprocessing sequentially goes through each cell type and converts the information about the cell to the program code. Alternatively or additionally, in some embodiments the program code implements a power consumption model. Alternatively or additionally, in some embodiments the program code simulates the behavior of each type of cell in the cells library. Alternatively or additionally, in some embodiments the processing the cells library, includes producing a table of $2^{2n}*m$ entries, where n stands for the number of input pins of the cell, and m stands for the number of the output pins.

In some exemplary embodiments of the invention there is provided a glitch simulation method including: (a) processing, by a data processor, each cell in a cells library to produce a table of $2^{2n}*m$ entries, where n stands for the number of input pins of the cell, and m stands for the number of the output pins; and (b) performing, by a data processor, a runtime calculation of a momentary power consumption caused by a glitch using a current state of the gate level netlist as an input. In some exemplary embodiments of the invention, the runtime calculation makes the power consumption proportional to:

$$\sum_{l=1}^{m} g_{p,c,l},$$

where m is the number of output pins, and p,c are the values of previous and current inputs for an investigated cell respectively;

where a precalculated table of this cell includes an entry $g_{p,c,l}$.

In some exemplary embodiments of the invention there is provided a method for simulating power consumption including: (a) receiving as an input at a data processor a cells library; and (b) processing the cells library to produce program code. In some exemplary embodiments of the invention, the program code implements a power consumption model. Alternatively or additionally, in some embodiments the program code simulates the behavior of each type of cell in the cells library. Alternatively or additionally, in some embodiments the processing includes producing a table of $2^{2n}*m$ entries, where n stands for the number of input pins of the cell, and m stands for the number of the output pins.

In some exemplary embodiments of the invention there is provided a method for simulating response of hardware to differential fault analysis (DFA) attacks including: (a) accessing, by a data processor, a list of records in a computer memory, the records defining a network gate, a time, and signal to simulate intervention into the normal execution of a semiconductor chip design; (b) keeping in a memory the current state of the network of gates as a gate level netlist file; (c) producing, by the data processor, the simulated intervention to the execution of the gate level netlist at a right time using a record from the list; and (d) monitoring a response of the execution to the simulated intervention. In some exemplary embodiments of the invention, the method includes receiving the records as a user input. Alternatively or additionally, in some embodiments the method includes providing the records as a predefined list. Alternatively or additionally, in some embodiments each record in the records includes a gate name, an identification of a pin where swapping of signal occurs and a time for swapping.

In some exemplary embodiments of the invention there is provided a semiconductor intellectual property (IP) core comprising a transformation engine accessing different transformation matrices and transforming a byte of data within a block of a block cipher and a cryptographic key from one representation of a Galois Field (GF) to another representation of the GF. In some exemplary embodiments of the invention, the transformation engine accesses a different transformation matrix for each successive round of the block cipher. Alternatively or additionally, in some embodiments the transformation engine applies 1 of at least 10 different transformation matrices for each successive round. Alternatively or additionally, in some embodiments the transformation engine applies 1 of at least 20 different transformation matrices for each successive round. Alternatively or additionally, in some embodiments the transformation engine applies 1 of at least 30 different transformation matrices for each successive round. Alternatively or additionally, in some embodiments the IP core is provided as an application-specific integrated circuit (ASIC) design. Alternatively or additionally, in some embodiments the IP core is provided as a field-programmable gate array (FPGA) logic designs. Alternatively or additionally, in some embodiments the block cipher is selected from the group consisting of AES, SM4, and ARIA. Alternatively or additionally, in some embodiments the transformation engine computes $X^Y$ by performing a series of: (i) multiplications of two different elements of the field; and (ii) raising an element of the field to a power Z wherein Z is a power of 2. According to these embodiments the number of multiplications (i) is at least two less than the number of ones (1s) in the binary representation of Y. In some embodiments, Y=254. Alternatively or additionally, in some embodiments a number of multiplications (i) is 4 or less.

In some exemplary embodiments of the invention there is provided a method of building different representations of the Galois Field (GF) implemented by a compact logic including: representing a $GF(2^8)$ as an equivalent tower field. In some exemplary embodiments of the invention, the equivalent tower field is $GF(((2^2)^2)^2)$. Alternatively or additionally, in some embodiments the equivalent tower field is $GF((2^4)^2)$. Alternatively or additionally, in some embodiments the equivalent tower field is represented in the polynomial basis. Alternatively or additionally, in some embodiments the equivalent tower field is represented in the normal basis. Alternatively or additionally, in some embodiments the method yields at least 432 different representations of the GF. Alternatively or additionally, in some embodiments the method includes computing $X^Y$ by performing a series of: (i) multiplications of two different elements of the field; and (ii) raising an element of the field to a power Z wherein Z is a power of 2. According to these embodiments the number of multiplications (i) is at least two less than the number of ones (1s) in the binary representation of Y. In some embodiments, Y=254. Alternatively or additionally, in some embodiments a number of multiplications (i) is 4 or less.

In some exemplary embodiments of the invention there is provided a method for simulating power consumption including: (a) receiving at least one member of the group consisting of a synthesized gate level netlist, a cells library and a testbench as input(s) at a data processor; (b) generating a power consumption model that includes consumption due to short circuit, intrinsic capacity, and glitches. In some exemplary embodiments of the invention, the receiving includes receiving at least two members of the group as inputs. Alternatively or additionally, in some embodiments the receiving includes receiving all three members of the group as inputs.

In some exemplary embodiments of the invention there is provided a method including: (a) manufacturing a first batch of processor chips with a same function and a first design; and (b) manufacturing a second batch of the processor chips with the same function and a second design. In some exemplary embodiments of the invention, the method includes a first set of representations of a GF in the first design and a second set of representations of the GF in the second design. Alternatively or additionally, in some embodiments the GF is $GF(2^8)$.

In some exemplary embodiments of the invention there is provided a semiconductor intellectual property (IP) core including a transformation engine designed and configured to represent each element of a field $GF(2^8)$ using a polynomial of degree no higher than 7+d, where d>0 is a redundancy parameter. In some embodiments, d≥9. In some embodiments, d≥24. Alternatively or additionally, in some embodiments the transformation engine represents a same field element by one of $2^d$ various ways (pairwise differing by terms that are multiples of P(x)), and at each moment of calculations chooses any of said various representations. Alternatively or additionally, in some embodiments the element of a field includes a byte of data within a block of a block cipher and a cryptographic key. Alternatively or additionally, in some embodiments the block cipher is selected from the group consisting of AES, SM4, and ARIA. Alternatively or additionally, in some embodiments the transformation engine computes $X^Y$ by performing a series of: (i) multiplications of two different elements of the field; and (ii) raising an element of the field to a power Z wherein Z is a power of 2. According to these embodiments the number of multiplications (i) is at least two less than the number of ones (1s) in the binary representation of Y. In some embodiments, Y=254. Alternatively or additionally, in some embodiments a number of multiplications (i) is 4 or less.

In some exemplary embodiments of the invention there is provided a method of building different representations of the Galois Field (GF) implemented by logic circuitry including: Representing each element of a field GF ($2^8$) using a polynomial of degree no higher than 7+d, where d>0 is a redundancy parameter. In some embodiments, d≥9. In some embodiments, d≥24. Alternatively or additionally, in some embodiments the method includes representing a same field element by one of $2^d$ various ways (pairwise differing by terms that are multiples of P(x)), and at each moment of calculations choosing any of said various representations. Alternatively or additionally, in some embodiments the element of a field includes a byte of data within a block of a block cipher and a cryptographic key. Alternatively or additionally, in some embodiments the block cipher is selected from the group consisting of AES, SM4, and ARIA. Alternatively or additionally, in some embodiments the method comprises computing $X^Y$ by performing a series of: (i) multiplications of two different elements of the field; and (ii) raising an element of the field to a power Z wherein Z is a power of 2. According to these embodiments the number of multiplications (i) is at least two less than the number of ones (1s) in the binary representation of Y. In some embodiments, Y=254. Alternatively or additionally, in some embodiments a number of multiplications (i) is 4 or less.

In some exemplary embodiments of the invention there is provided a semiconductor intellectual property (IP) core including a transformation engine including: (a) a first mask application engine; (b) a second mask engine adapted to apply a second mask prior to the performance of any non-linear calculation; and (c) a removal engine adapted to remove the first mask after the second mask is in place and prior to performance of any non-linear calculation and remove the second mask when all calculations are complete. In some embodiments, the second mask is a redundancy mask. Alternatively or additionally, in some embodiments the first mask is an additive mask. Alternatively or additionally, in some embodiments wherein d≥9. Alternatively or additionally, in some embodiments d≥24. Alternatively or additionally, in some embodiments the transformation engine represents a same field element by one of $2^d$ various ways (pairwise differing by terms that are multiples of P(x)), and at each moment of calculations chooses any of the various representations. Alternatively or additionally, in some embodiments the masks are applied to elements of a field which includes a byte of data within a block of a block cipher and a cryptographic key. Alternatively or additionally, in some embodiments the IP core is configured for use with a block cipher selected from the group consisting of AES, SM4, and ARIA.

In some exemplary embodiments of the invention there is provided a masking method for block ciphers implemented by logic circuitry including: (a) applying a first mask; (b) applying a second mask prior to performance of any non-linear calculation; (c) removing the first mask after the second mask is in place and prior to performance of any non-linear calculation; and (d) removing the second mask. In some exemplary embodiments of the invention, the second mask is a redundancy mask. Alternatively or additionally, in some embodiments the first mask is an additive mask. Alternatively or additionally, in some embodiments wherein d≥9. Alternatively or additionally, in some embodiments wherein d≥24. Alternatively or additionally, in some embodiments the method includes representing a same field element by one of $2^d$ various ways (pairwise differing by terms that are multiples of P(x)), and at each moment of calculations chooses any of the various representations. Alternatively or additionally, in some embodiments each element of a field includes a byte of data within a block of a block cipher and a cryptographic key. Alternatively or additionally, in some embodiments the method is applied to a block cipher selected from the group consisting of AES, SM4, and ARIA.

In some exemplary embodiments of the invention there is provided a method including: (a) providing a cryptographic key; and (b) associating a check sum datum with said key.

In some exemplary embodiments of the invention, the key includes at least 64 bits. Alternatively or additionally, in some embodiments the key includes at least 128 bits.

Alternatively or additionally, in some embodiments the check sum datum is in a format selected from the group consisting of cyclic redundancy check (CRC), Fletcher's checksum, Adler-32, SAE J1708, longitudinal parity check, Hash function and error detection code.

Alternatively or additionally, in some embodiments the method includes performing key scheduling on said cryptographic key to produce a set of round keys and associating an additional checksum datum of a last round key in the set of round keys with the cryptographic key.

In some exemplary embodiments of the invention there is provided a method of improving performance of a data processor including: in a field of characteristic 2 computing $X^Y$ by performing a series of: (i) multiplications of two different elements of the field; and (ii) raising an element of the field to a power Z wherein Z is a power of 2; wherein the number of multiplications (i) is at least two less than the number of ones (1s) in the binary representation of Y. In some embodiments, the field is $ZF(2^8)$. Alternatively or additionally, in some embodiments Y=254. Alternatively or additionally, in some embodiments a number of multiplications (i) is 4 or less. (e.g. 3 or 2 or 1 or 0).

In some exemplary embodiments of the invention there is provided method comprising: (a) providing a cryptographic key; (b) performing key scheduling on said cryptographic key to produce a set of round keys; and (c) associating a checksum datum of a last round key in said set of round keys with said cryptographic key. In some exemplary embodiments of the invention, the method includes associating a check sum datum of the cryptographic key with the cryptographic key.

For purposes of this specification and the accompanying claims, all gerund verb forms and their conjugates indicate actions performed by a data processor unless otherwise indicated.

For purposes of this specification and the accompanying claims, the expressions GF($2^8$), GF(256) and $F_{256}$ are equivalent.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

The term "IP core" as used in this specification and the accompanying claims indicates both prebuilt cells for integration into an existing system-on-chip (SoC) and production specifications for such cells. For purposes of this specification and the accompanying claims, "production specifications" includes bit is not limited to, "RTL" files, "gate level netlist" files and "after place and route netlist" files.

As used herein, the terms "comprising" and "including", or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Implementation of the method and/or IP core according to embodiments of the invention involves performing or completing selected tasks or steps automatically. Moreover, according to actual instrumentation and equipment of exemplary embodiments of methods, apparatus and IP cores of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and IP core of the invention could be described as being performed by a data processor, such as a computing platform for executing a plurality of instructions.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EMBODIMENTS

Embodiments of the invention relate to methods and hardware useful in reducing vulnerability to various types of hardware attack.

Specifically, some embodiments of the invention can be used to simulate power consumption from a design specification of a chip.

For purposes of this specification and the accompanying claims the terms "encryption" and "decryption" include, but are not limited to, digital signing (e.g. using hash functions and/or block ciphers). Various exemplary embodiments of the invention relate to use of block ciphers and/or hash function to implement password protection and/or increase data integrity and/or to conceal information.

The principles and operation of methods and/or hardware of various exemplary embodiments of the invention may be better understood with reference to the drawings and accompanying descriptions.

Before explaining at least one embodiment of the invention in detail, it is to be understood that the invention is not limited in its application to the details set forth in the following description. The invention is capable of other embodiments or of being practiced or carried out in various ways. Also, it is to be understood that the phraseology and terminology employed herein is for the purpose of description and is not limiting.

System Overview

Figure 1:
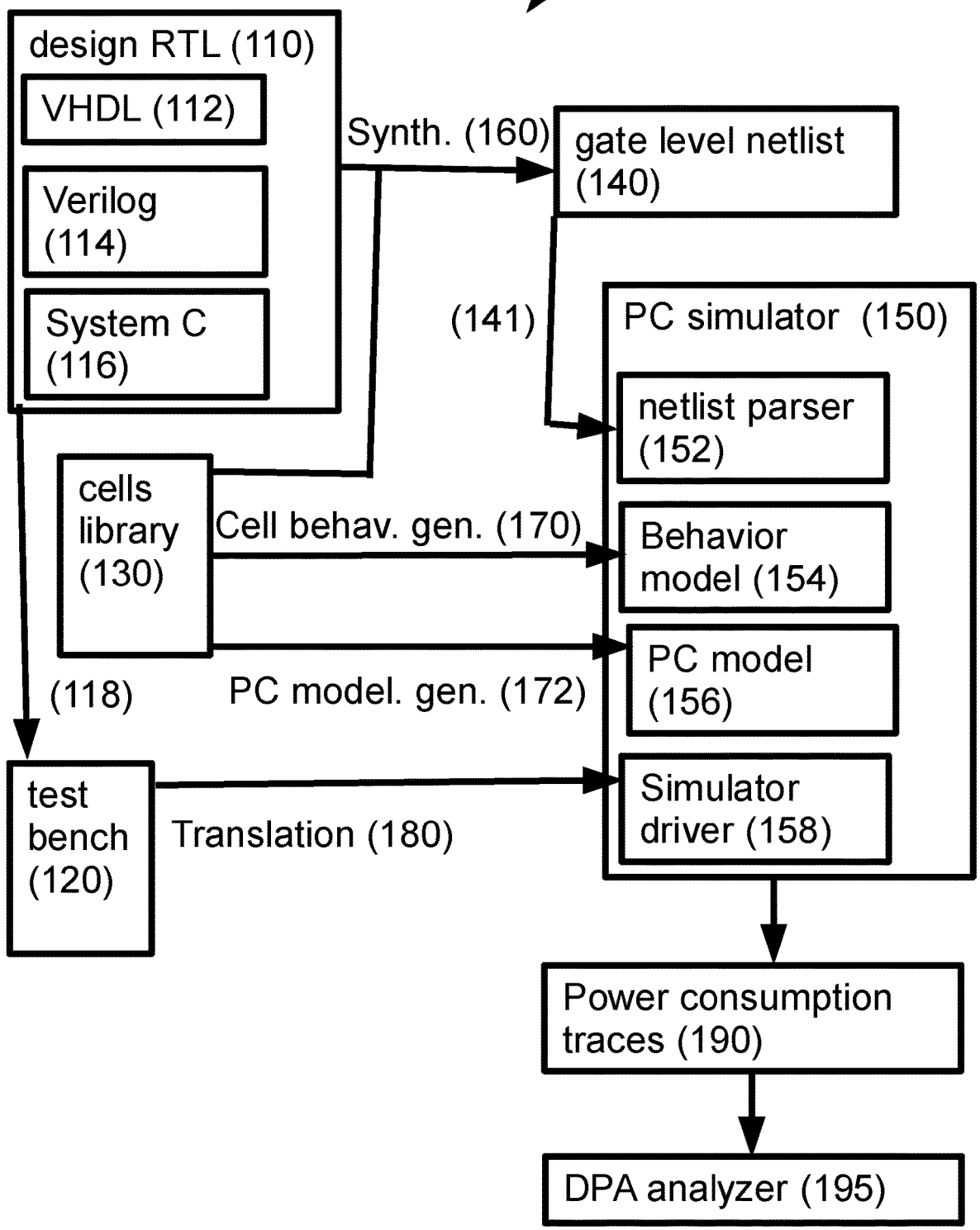
FIG. 1 is a schematic overview of software architecture of various exemplary embodiments of the invention.

FIG. 1 is a schematic overview of software architecture, indicated generally as 100, of various exemplary embodiments of the invention.

RTL design (110) implements functional modules in a hardware description language (e.g. VHDL 112; Verilog 114 or System C 116). Each statement in the system design represents many lines of RTL code. In the depicted embodiment, a separate hardware verification 118 takes the design RTL 110 and designs test benches 120 to check that RTL 110 performs properly.

Synthesis 160 maps RTL 110 and cells library 130 (see 410 in FIG. 4) onto a gate level netlist 140. In the depicted embodiment, gate level netlist 140 serves as an input 141 for netlist parser 152 of power consumption (PC) simulator 150. See also 210 in FIG. 2 and/or 520 in FIG. 5.

In the depicted embodiment, cells library 130 generates 170 a cell behavior model 154 (see 250 in FIG. 2 and/or 320 in FIG. 3) which is used by PC simulator 150. Details of exemplary generating 170 are provided below in the context of FIG. 2, item 220 and/or 320 in FIG. 3 and/or 420 in FIG. 4.

In the depicted embodiment, cells library 130 generates 172 a PC model 156 (see 250 in FIG. 2 and/or 320 in FIG. 3) which is used by PC simulator 150. PC model 156 models glitches and/or short circuit and/or intrinsic capacitance as described in greater detail hereinbelow. Details of exemplary generating 172 are provided below in the context of FIG. 2, item 220 and/or 310 in FIG. 3 and/or 420 in FIG. 4.

In the depicted embodiment, translation 180 of RTL testbench 120 produces simulator driver which is used by PC simulator 150. For additional details of exemplary translation 180 see 260 and/or 270 in FIG. 2.

In the depicted embodiment, PC simulator 150 integrates netlist parser 152, behavior model 154 (see also 240 and/or 250 in FIG. 2), PC model 156 (see also 250 in FIG. 2) and simulator driver 158 (see also 230 in FIG. 2 and/or 530 in FIG. 5) to produce simulated power consumption traces 190 as explain in detail hereinbelow in the context of FIG. 2. Power consumption traces 190 serves as an input to Differential Power Analysis (DPA) analyzer 195. In a DPA hardware attack, analyzer 195 has the potential to discover a cryptographic key. In some embodiments of the invention DPA analyzer 195 produces a vulnerability score as an output.

First Exemplary Method

Figure 2:
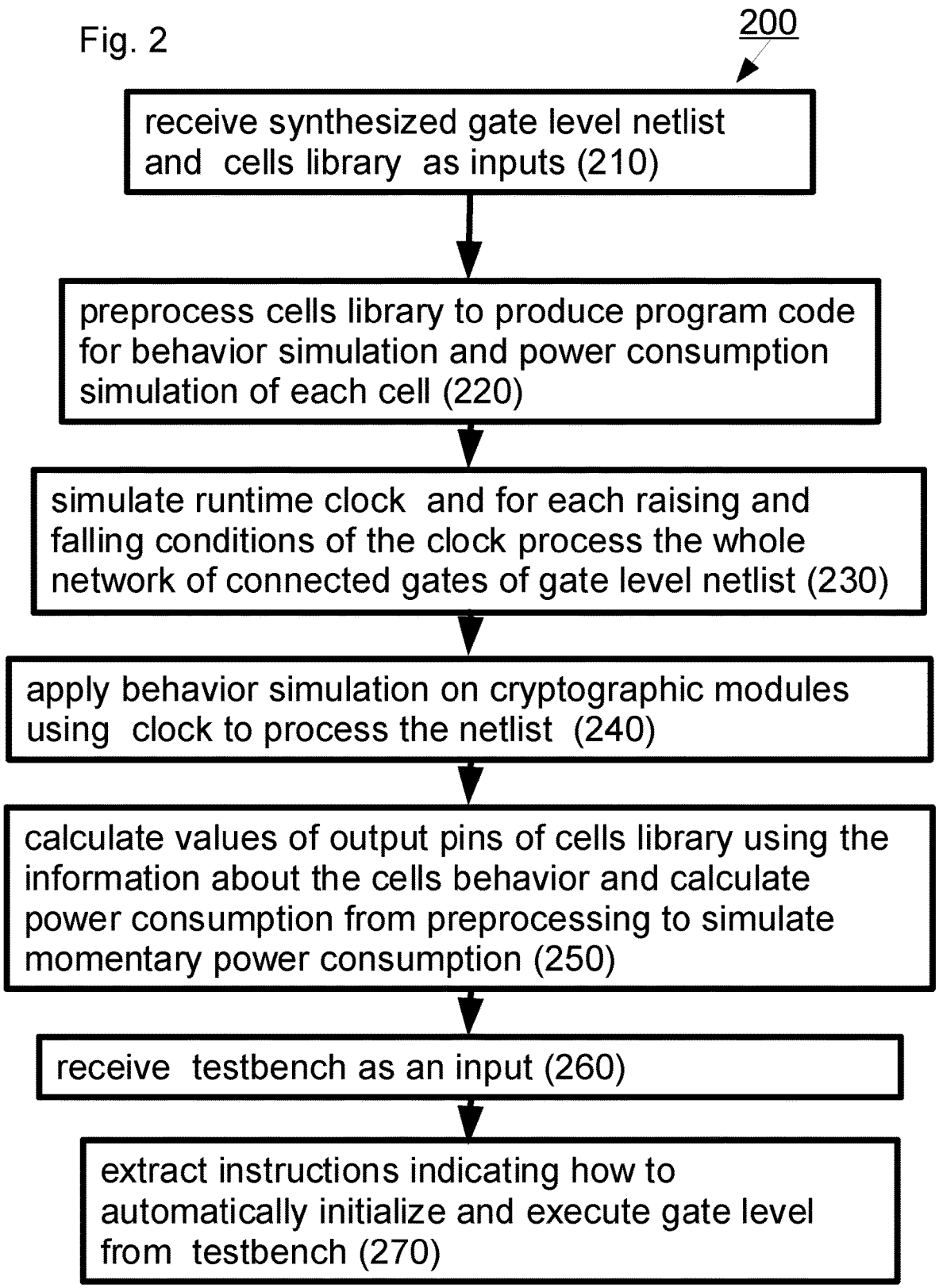
FIG. 2 is a simplified flow diagram of a method according to some exemplary embodiments of the invention.

FIG. 2 is a simplified flow diagram of a method for simulating power consumption of a chip, indicated generally as 200, according to some exemplary embodiments of the invention.

Depicted exemplary method 200 includes receiving 210 as inputs at a data processor a synthesized gate level netlist and a cells library (e.g. in SYNOPSIS Liberty format). Receiving 210 corresponds to 141 in FIG. 1.

In the depicted embodiment, the cells library is preprocessed 220 by the data processor to produce program code for behavior simulation (see behavior model 154 in FIG. 1) and power consumption simulation (see PC model 156 of FIG. 1) of each cell. Preprocessing 220 corresponds to 170 and 172 in FIG. 1.

In the depicted embodiment, method 200 includes simulating 230 a runtime clock and for each raising and falling conditions of the clock processing the whole network of connected gates of the gate level netlist. Simulating 230 corresponds to 158 in FIG. 1.

In some exemplary embodiments of the invention, method 200 includes applying 240 the behavior simulation on cryptographic modules using the runtime clock to process the netlist. In some embodiments, applying 240 is performed synchronously, in other embodiments asynchronously. Applying 240 corresponds to 154 in FIG. 1.

In the depicted embodiment, method 200 includes calculating 250 values of output pins of the cells library using the information about the cells behavior and calculating power consumption from preprocessing 220 to simulate the momentary power consumption. Calculating 250 corresponds to 154 and 156 in FIG. 1.

In some exemplary embodiments of the invention, method 200 includes receiving 260 a testbench as an input at the data processor and extracting 270 instructions from said RTL testbench. According to these embodiments, the instructions indicate how to automatically initialize and execute the gate level netlist. Receiving 260 corresponds to 180 in FIG. 1. Extracting 270 corresponds to 180 in FIG. 1.

In some exemplary embodiments of the invention, preprocessing 220 sequentially goes through each cell type, described in a cells library, and converts the information about the cell to the program code. In these embodiments, one of four generation functions is applied according to the cell type (combinational, flip-flops, latches and state tables). This conversion generates the behavior simulation code and power consumption simulation code including glitches.

A test bench specifies how to initialize the input pins of the main module, how to advance a clock, when to run design under test (DUT) and when to stop the execution.

In some embodiments the program code is in C++.

In some embodiments DPA vulnerability is estimated from program code and simulated momentary power consumption plus information gleaned from the testbench. Collection of statistics on power consumption traces for many different inputs to the design under test (DUT) followed by application of analytics tools that try to attack the key using the simulated power consumption collected.

In some embodiments the program code from 220 implements a power consumption model (e.g. 156 in FIG. 1). According to these embodiments, the power consumption model has three components: short circuit, intrinsic capacity, and glitches. Glitches account for the volatility of the electrical current before it becomes stable at the boundary of a clock.

Alternatively or additionally, in some embodiments the program code from 220 simulates the behavior of each type of cell in the cells library (e.g. combinational cells, flip-flops, latches and state tables).

In some exemplary embodiments of method 200, preprocessing 220 includes producing a table of $2^{2n}*m$ entries, where n stands for the number of input pins of the cell, and m stands for the number of the output pins.

In other words, for every output pin of the cell $o_l$, its logic function is denoted by by $f_l$ and every possible combination of input pairs is considered. Let denote a pair of inputs (i,j) to the cell at two consecutive clock cycles as $(b^i = (b_1{}^i b_2{}^i \ldots, b_n{}^i), b^j = (b_1{}^j b_2{}^j \ldots, b_n{}^j))$, where $b_k{}^{i(j)}$ is an input pin (bit) number k of the input i(j), where k runs from 1 to n.

There are n! possible orders in which inputs $b^j$ replace inputs $b^i$. For every such order there are n-1 intermediate states for the output pin $o_l$. At every state, we calculate either the total power consumption at the pin $o_l$ corresponding to a randomly chosen order, or a weighed sum of total power consumption values corresponding to multiple orders, and store the result to the entry $g_{i,j,l}$ of the table.

Exemplary QA Terminal

In some embodiments of the invention, an operator of a quality assurance terminal provides design RTL 110 (FIG. 1) (e.g. VHDL 112 and/or Verilog 114 and/or System C 116) as inputs to a data processor and receives power consumption traces 190 (and or electromagnetic emission traces) and/or output of DPA analyzer 195 as output. Using these outputs, a decision is made about whether to change the design RTL 110.

In some embodiments of the invention, the data processor of the quality assurance terminal synthesizes 160 a gate level netlist 520 (FIG. 5) from the input(s) and applies a simulated intervention 530. According to these embodiments monitoring 550 of the response to the intervention is helpful in making a decision about whether to change the design RTL 110.

Second Exemplary Method

Figure 3:
FIG. 3 is a simplified flow diagram of a method according to some exemplary embodiments of the invention.

FIG. 3 is a simplified flow diagram, indicated generally as 300, of a glitch simulation according to some exemplary embodiments of the invention.

Depicted exemplary method 300 includes processing 310, by a data processor, each cell in a cells library to produce a table of $2^{2n}*m$ entries, where n stands for the number of input pins of the cell, and m stands for the number of the output pins and performing 320, by a data processor, a runtime calculation of the momentary power consumption caused by a glitch using a current state of the gate level netlist as an input. Processing 310 corresponds to 172 in FIG. 1. Performing 320 corresponds to 154 and/or 156 in FIG. 1.

During the simulation of the netlist, every cell is processed to calculate the values of its output pins and then the momentary power consumption is simulated. The ingredient of the power consumption caused by glitch is calculated as follows:

Denote by $b_p$—the value of the previous input to the cell, by $b_c$ the value of the current one, and by $o_l$—the current value of the output pin l. Now, look at the precalculated table of this cell and retrieve the entry $g_{p,c,l}$.

In some exemplary embodiments of the invention, the runtime calculation performed at 320 makes the power consumption proportional to:

$$\sum_{l=1}^{m} g_{p,c,l},$$

where m is the number of output pins, and p, c are the values of the previous and current inputs for the investigated cell respectively;

where a precalculated table of this cell includes an entry $g_{p,c,l}$.

Additional details pertaining to pre-calculation are presented hereinabove in the context of preprocessing 220 of method 200.

In some embodiments of the invention analysis of the runtime calculation 320 provides a vulnerability score as an output. In these embodiments the vulnerability score indicates the likelihood that the momentary power consumption could reveal the cryptographic key.

Third Exemplary Method

Figure 4:
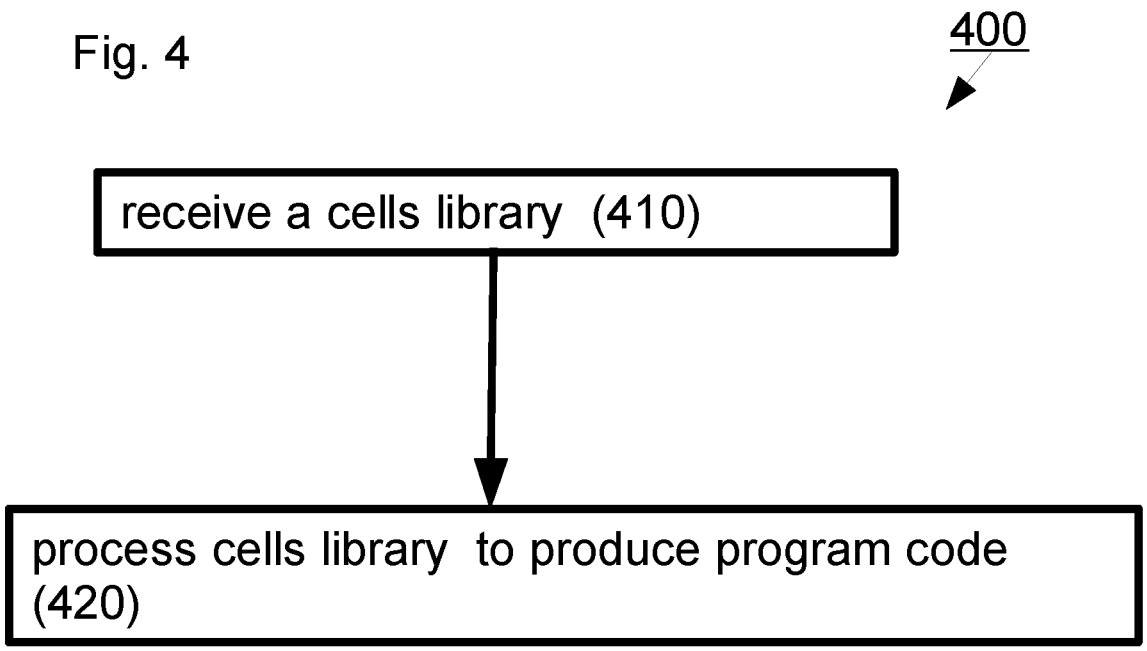
FIG. 4 is a simplified flow diagram of a method according to some exemplary embodiments of the invention.

FIG. 4 is a simplified flow diagram of a power consumption simulation method, indicated generally as 400, according to some exemplary embodiments of the invention.

Depicted exemplary method 400 includes receiving 410 as an input at a data processor a cells library and processing 420 said cells library to produce program code. In some embodiments, the program code is in C++. In some exemplary embodiments of method 400, the program code implements a power consumption model. In some embodiments, power consumption model has three components, short circuit, intrinsic capacity, and glitches. Glitches account for the volatility of the electrical current before it becomes stable at the boundary of a clock. Receiving 410 corresponds to 130 in FIG. 1. Processing 420 corresponds to 170 and/or 172 in FIG. 1.

In some embodiments of method 400, the program code (e.g. 154 in FIG. 1) simulates the behavior of each type of cell in said cells library. (e.g. combinational cells, flip-flops, latches and state tables)

In some embodiments of method 400, the processing includes producing a table of $2^{2n}*m$ entries, where n stands for the number of input pins of the cell, and m stands for the number of the output pins. Additional details of processing are provided hereinabove in the context of preprocessing 220 of method 200.

Fourth Exemplary Method

Figure 5:
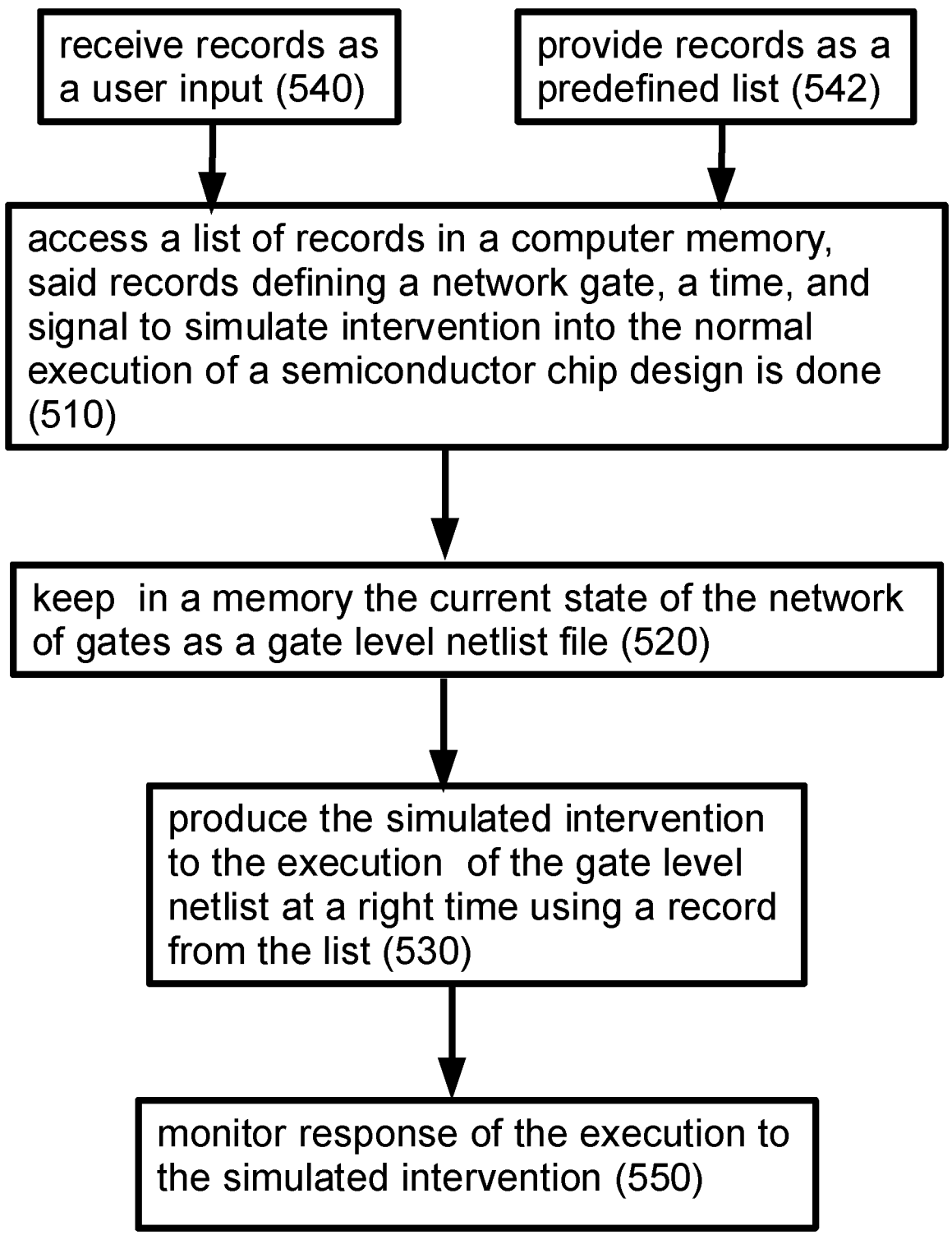
FIG. 5 is a simplified flow diagram of a method according to some exemplary embodiments of the invention.

FIG. 5 is a simplified flow diagram of a method of simulating response of hardware to differential fault analysis (DFA) attacks, indicated generally as 500, according to some exemplary embodiments of the invention;

Depicted exemplary method 500 includes accessing 510, by a data processor, a list of records in a computer memory, the records defining a network gate, a time, and signal to simulate intervention into the normal execution of a semiconductor chip design.

In the depicted embodiment, method 500 includes keeping 520 in a memory the current state of the network of gates as a gate level netlist file. According to various exemplary embodiments of the invention, the memory used at 510 and 520 are a same memory or a different memory. Keeping 520 corresponds to 150 in FIG. 1.

In some embodiments method 500 includes producing 530, by said data processor, the simulated intervention to the execution of the gate level netlist at a right time using a record from the list at 510. For example, an intervention can be a signal change from 0 to 1 or from 1 to 0. Producing 530 corresponds to 158 in FIG. 1.

According to various exemplary embodiments of the invention, the list of records at 510 is received 540 said records as a user input or provided 542 as a predefined list.

In some embodiments each record in the records at 510 includes a gate name, an identification of a pin where swapping of signal occurs and a time for swapping. In some embodiments, timing is defined in terms of the runtime clock.

Alternatively or additionally, in some embodiments, method 500 includes monitoring 550 a response of the execution to the simulated intervention. In some embodiments, monitoring 550 includes provision of an output indicating how effective the device was in reacting to the intervention.

Exemplary IP Core

Figure 6:
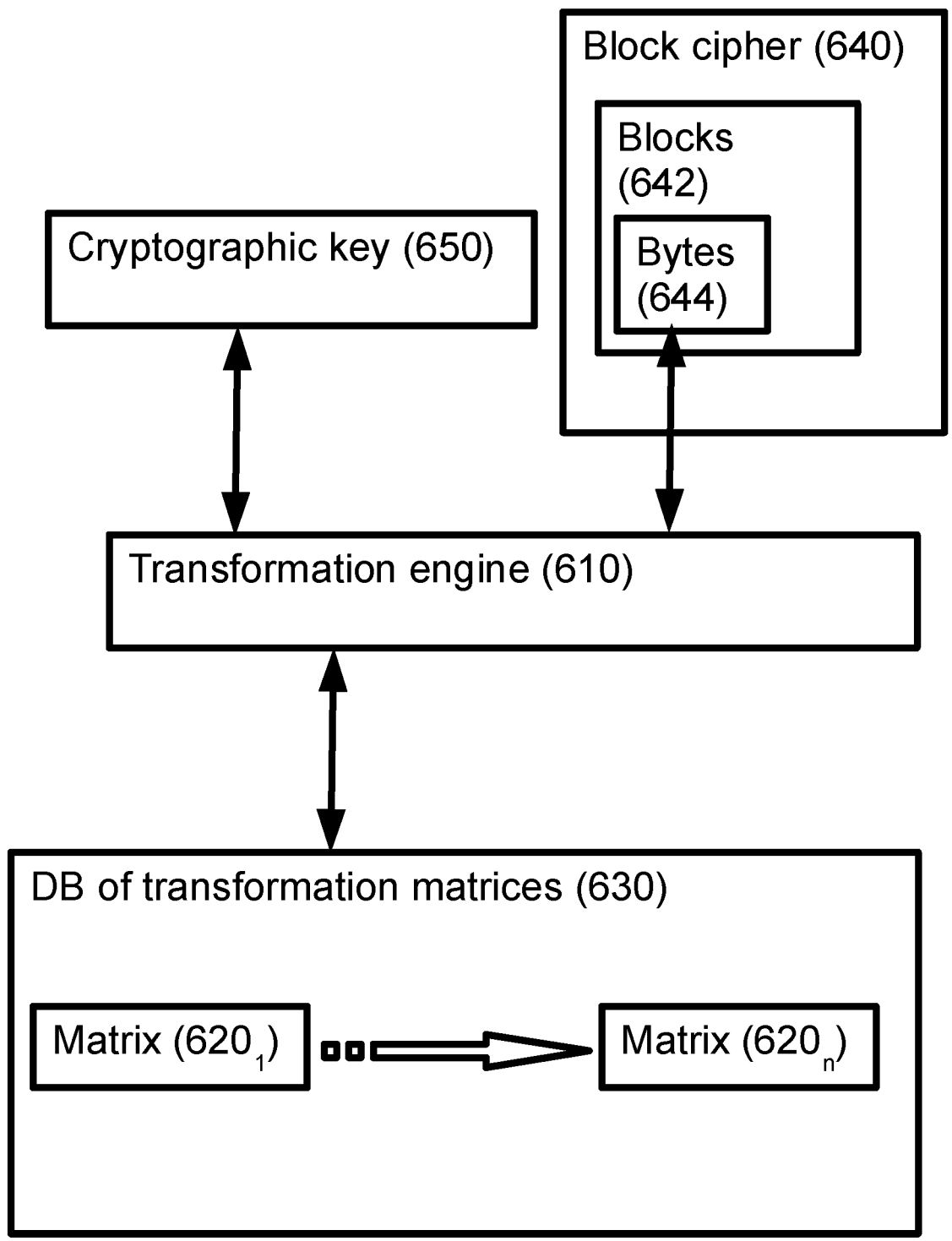
FIG. 6 is a schematic representation of an IP core according to some exemplary embodiments of the invention.

FIG. 6 is a schematic representation of an IP core, indicated generally as 600, according to some exemplary embodiments of the invention.

Depicted exemplary semiconductor intellectual property (IP) core 600 includes a transformation engine 610 accessing different transformation matrices and transforming a byte 644 of data within a block 644 of a block cipher 640 and a cryptographic key from one representation of a Galois Field (GF) to another representation of the GF.

In some embodiments, the transformation engine replaces key 650 with its representation in another algebraic structure to produce another value of the key thereby causing block-cipher calculations to be performed on a different key. Alternatively or additionally, converting each byte 644 of an input block 642 once, and doing all of the AES algorithm in the new form, only converting back at the end of all the rounds. Since all the arithmetic in the AES algorithm is Galois arithmetic, this works provided the key was appropriately converted as well. Alternatively or additionally, one can change into the subfield basis on entering the S-box and to change back again on leaving it.

In the depicted embodiment, core 600 accesses a database 630 of transformation matrices $620_1$ to $620_n$.

In some embodiments, transformation engine 610 accesses a different transformation matrix $620_1$ to $620_n$ for each successive round of the block cipher. According to various exemplary embodiments of the invention, transformation engine 610 employs random selection or a secret key to select a transformation matrix. In some embodiments during a round the same representation of the Galois Field is used.

According to various exemplary embodiments of the invention transformation engine 610 applies 1 of at least 10, at least 15, at least 20, at least 25, at least 30, at least 35, at least 40, at least 45, at least 50, at least 100 or lesser, or intermediate or greater numbers of different transformation matrices for each successive round.

The number of different possibilities of the key is between 10 and 100 depending on the choice of the number of representations of different types $m_1$ and $m_2$ (as described in detail hereinbelow). The level of noise the attacker will have is 10 to 100 times bigger than in an attack on the regular implementation. Thus, the factor of a number of traces required to remove the noise will be a square of the factor of noise. In other words, it will be between 100 (for 10 representations) and 10000 (for 100 representations). Such a design, depending on the configuration, resists attacks that involve between 1 million and 100 million traces.

According to various exemplary embodiments of the invention, the IP core is provided as an application-specific integrated circuit (ASIC) design or as a field-programmable gate array (FPGA) logic design. Alternatively or additionally, in various embodiments the block cipher is selected from the group consisting of AES, SM4, and ARIA. Alternatively or additionally, the IP core has a power consumption pattern (traces) and/or pattern of electromagnetic emission (traces) which is non-informative. In some embodiments the non-informative nature of the power consumption pattern contributes to a decrease in susceptibility to hardware attacks. Alternatively or additionally, in some embodiments the IP core will not reveal information useful in mounting a hardware attack in response to fault injection.

In some embodiments, transformation engine 610 computes $X^Y$ by performing a series of: (i) multiplications of two different elements of the field; and (ii) raising an element of the field to a power Z wherein Z is a power of 2. According to these embodiments the number of multiplications (i) is at least two less than the number of ones (1s) in the binary representation of Y. In some embodiments, Y=254. Alternatively or additionally, in some embodiments a number of multiplications (i) is 4 or less.

Fifth Exemplary Method

Figure 7:
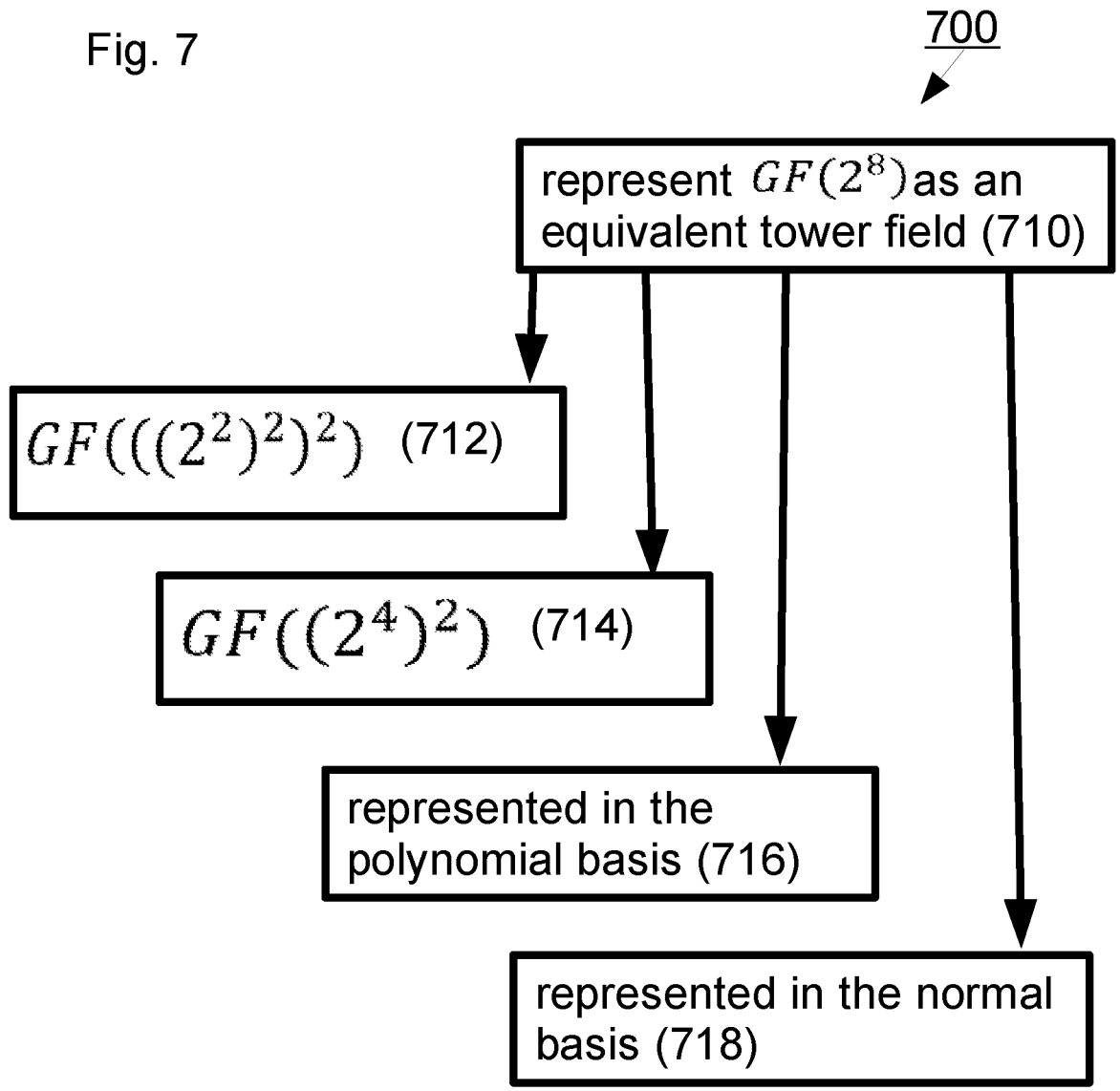
FIG. 7 is a simplified flow diagram of a method according to some exemplary embodiments of the invention.

FIG. 7 is a simplified flow diagram of a method for building different representations of a Galois Field (GF) implemented by a compact logic, indicated generally as 700, according to some exemplary embodiments of the invention.

Depicted exemplary method 700 includes representing 710 a $GF(2^8)$ as an equivalent tower field.

In some embodiments of method 700 the equivalent tower field 712 is $GF(((2^2)^2)^2)$.

In some embodiments of method 700 the equivalent tower field 714 is $GF((2^4)^2)$.

In some embodiments of method 700, the equivalent tower field 716 is represented in the polynomial basis.

In some embodiments of method 700 the equivalent tower field 718 is represented in the normal basis.

In some embodiments, method 700 yields at least 432 different representations of the GF.

In actual practice, transformation is only conducted on those elements of the field, or portions thereof, which are being used in calculations.

Some embodiments of method 700 include computing $X^Y$ by performing a series of: (i) multiplications of two different elements of the field; and (ii) raising an element of the field to a power Z wherein Z is a power of 2. According to these embodiments the number of multiplications (i) is at least two less than the number of ones (1s) in the binary representation of Y. In some embodiments, Y=254. Alternatively or additionally, in some embodiments a number of multiplications (i) is 4 or less.

Sixth Exemplary Method

Figure 8:
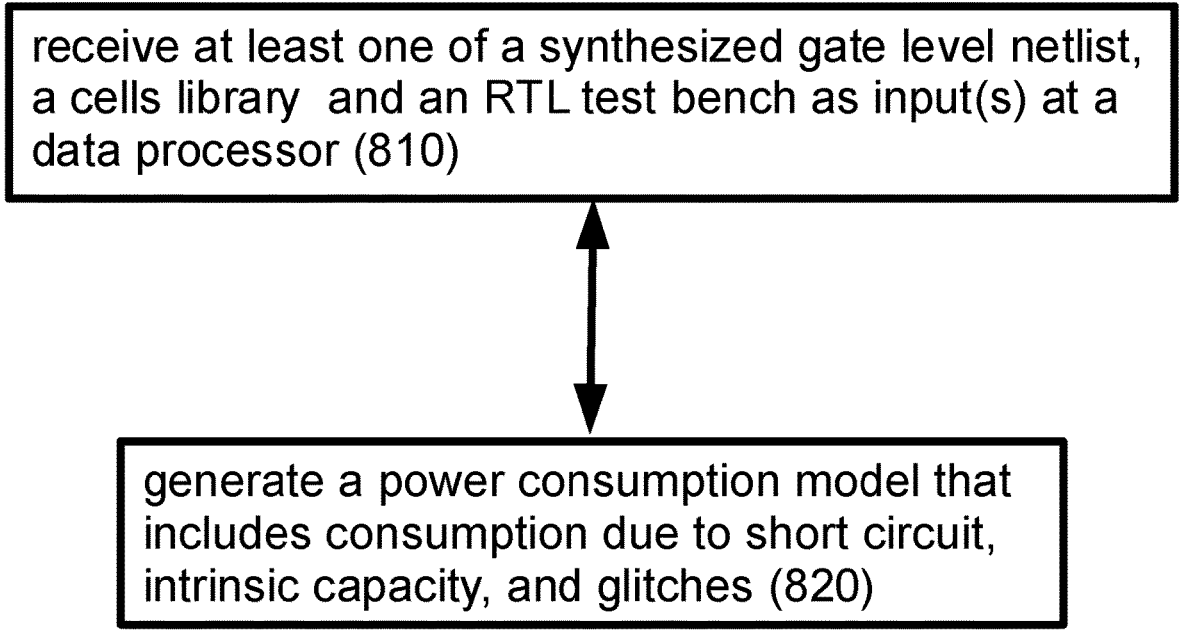
FIG. 8 is a simplified flow diagram of a method according to some exemplary embodiments of the invention.

FIG. 8 is a simplified flow diagram of a method for simulating power consumption, indicated generally as 800, according to some exemplary embodiments of the invention.

Depicted exemplary method 800 includes receiving 810 at least one member of the group consisting of a synthesized gate level netlist, a cells library and a test bench as input(s) at a data processor and generating 820 a power consumption model that includes power consumption due to short circuit, due to intrinsic capacity, and due to glitches. In some exemplary embodiments of the invention, receiving 810 includes receiving at least two members of the group as inputs or all three members of the group as inputs.

Seventh Exemplary Method

Figure 9:
FIG. 9 is a simplified flow diagram of a method according to some exemplary embodiments of the invention.

FIG. 9 is a simplified flow diagram of a production method for microprocessor chips, indicated generally as 900, according to some exemplary embodiments of the invention.

Depicted exemplary method 900 includes manufacturing 910 a first batch of processor chips with a same function and a first design and manufacturing 920 a second batch of the (same) processor chips with the same function and a second design. The second design is different from the first design. In some embodiments the chips include a first set of representations of a GF in the first design and a second set of representations of the GF in the second design. In some exemplary embodiments of the invention, the GF is $GF(2^8)$.

In some exemplary embodiments of the invention, practice of method 900 contributes to a reduction in the usefulness of information gleaned from a successful hardware attack on one chip for a similar attack on another chip from a different batch. Alternatively or additionally, in some embodiments the number of batches and designs is increased while preserving the same function.

Additional Exemplary IP Core

Figure 10:
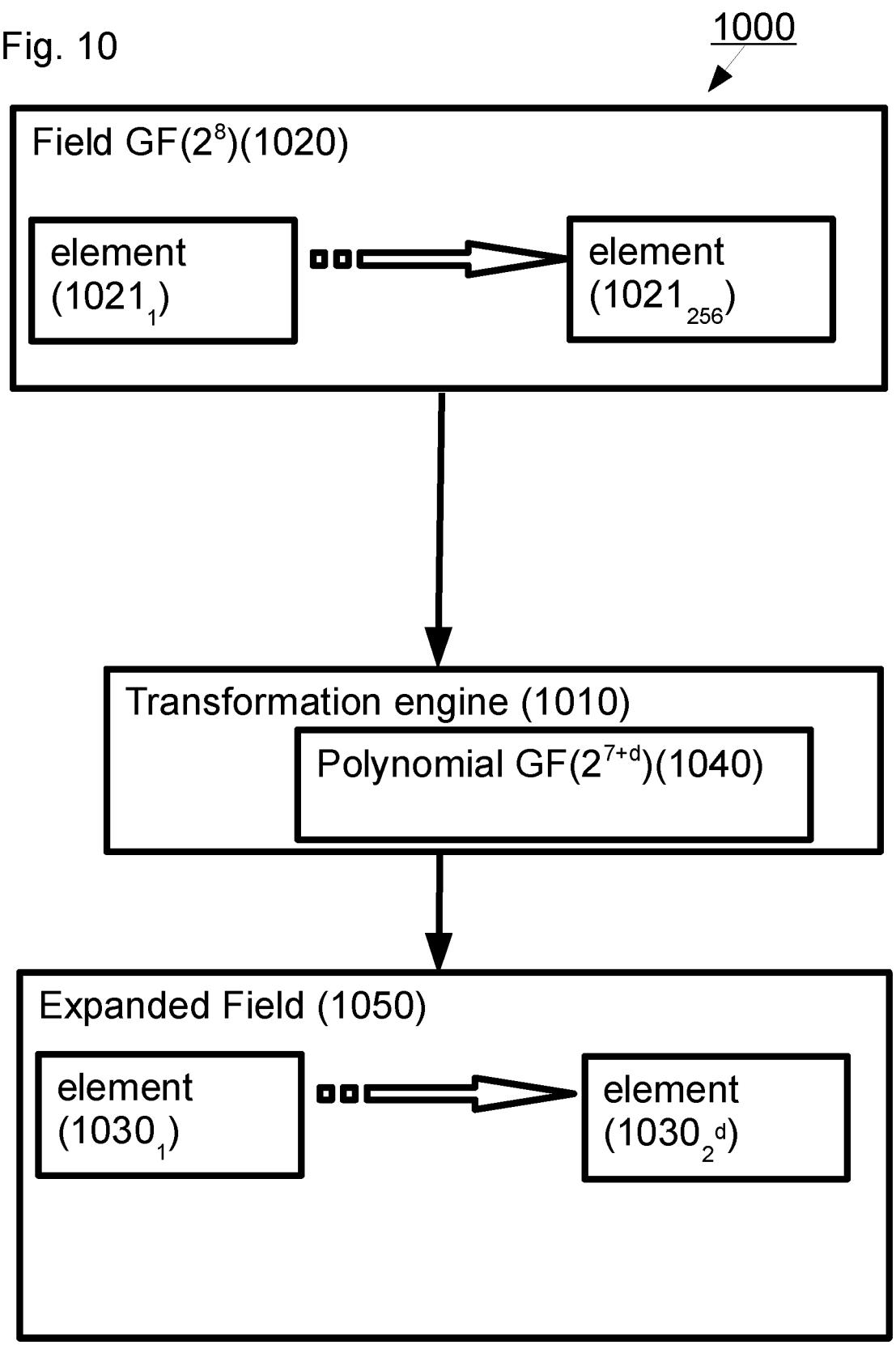
FIG. 10 is a simplified schematic representation of a semiconductor intellectual property (IP) core according to some exemplary embodiments of the invention.

FIG. 10 is a schematic representation of a semiconductor intellectual property (IP) core indicated generally as 1000. Depicted exemplary IP core 1000 includes a transformation engine 1010 designed and configured to represent each element $1021_{1\ldots 256}$ of a field $GF(2^8)$ 1020 using a polynomial 1040 of the form $GF(2^{7+d})$ where d>0 is a redundancy parameter. Although transformation engine 1010 designed and configured to represent each element $1021_{1...256}$ of a field GF($2^8$) 1020 using a polynomial 1040, in actual practice, transformation using the polynomial is only conducted on those elements 1021, or portions thereof, which are being used in calculations.

Transformation engine 1010 generates transformed elements $1030_1$ to $1030_{2^d}$ for each of elements $1021_{(1...256)}$ in field 1020. The 256 sets of $2^d$ elements 1030 are used to populate expanded field 1050. (A single set is depicted in the figure for clarity.) For example if d=9, the expanded field 1050 will include 131,072 elements 1030 with 512 elements 1030 corresponding to each of elements 1021. All of the 512 elements 1030 corresponding to a single element 1021 are algebraically equivalent.

For example if d=24, the expanded field 1050 will include 4,294,967,296 elements 1030 with 16,777,216 elements 1030 corresponding to each of elements 1021. All of the 16,777,216 elements 1030 corresponding to a single element 1021 are algebraically equivalent.

In some exemplary embodiments of the invention, increasing the value of redundancy parameter d contributes to an increase in security with respect to various types of attacks. According to various exemplary embodiments of the invention transformation engine 1010 employs d≥9; d≥12; d≥14; d≥16; d≥18; d≥20; d≥24; d≥32; d≥48 or intermediate or greater values of d.

In some exemplary embodiments of the invention, transformation engine 1010 represents a same field element 1021 by one of $2^d$ various ways (pairwise differing by terms that are multiples of P(x)), and at each moment of calculations chooses any of the various representations. Alternatively or additionally, in some embodiments each of elements $1021_1...n$ of field 1020 include a byte of data within a block of a block cipher or a cryptographic key. According to various exemplary embodiments of the invention the block cipher is selected from the group consisting of AES, SM4, and ARIA.

In some embodiments, transformation engine 1010 computes $X^Y$ by performing a series of: (i) multiplications of two different elements of the field; and (ii) raising an element of the field to a power Z wherein Z is a power of 2. According to these embodiments, the number of multiplications (i) is at least two less than the number of ones (1s) in the binary representation of Y. In some embodiments, wherein Y=254. Alternatively or additionally, in some embodiments a number of multiplications (i) is 4 or less.

Additional Exemplary Method

Figure 11:
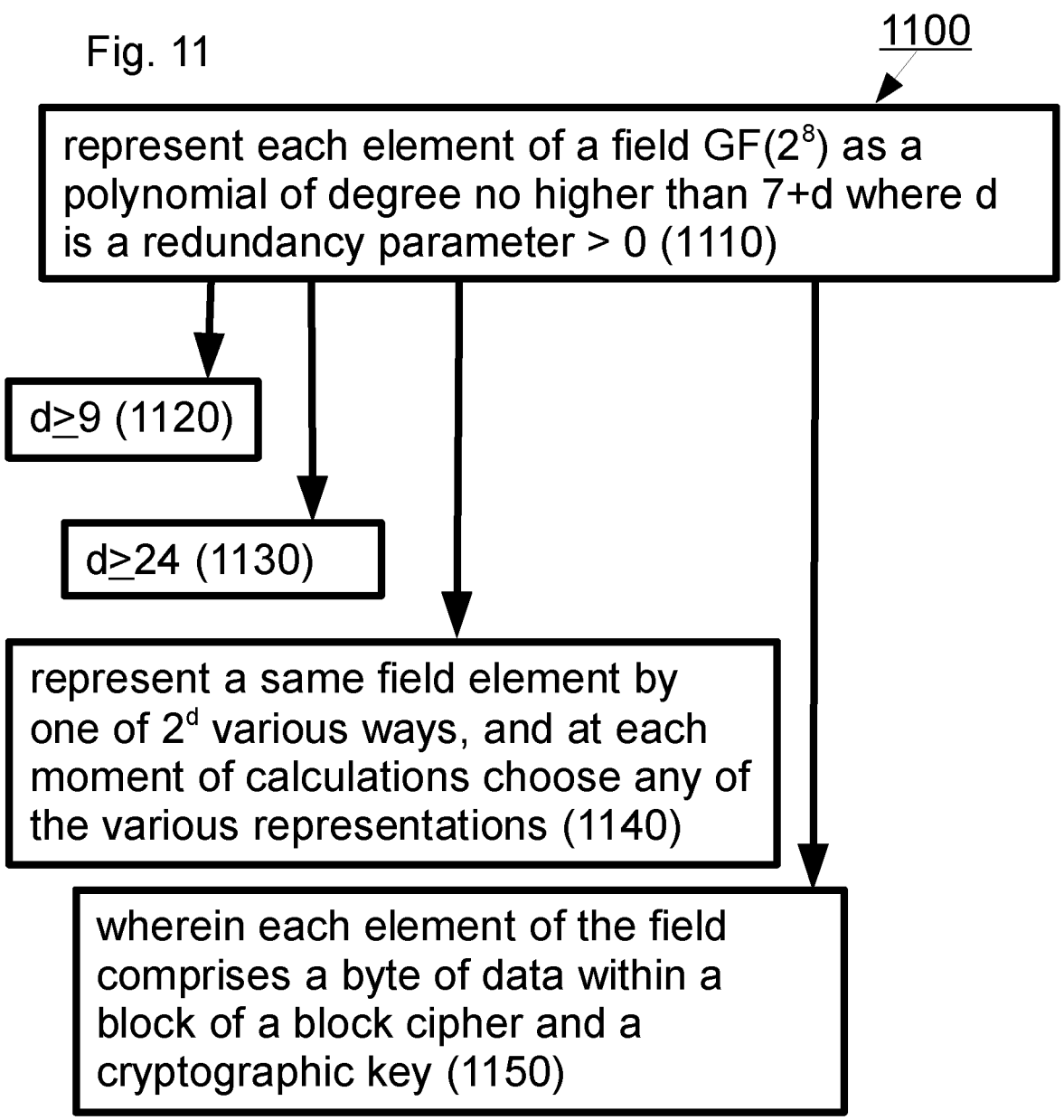
FIG. 11 is a simplified flow diagram of a method according to some exemplary embodiments of the invention.

FIG. 11 is a simplified flow diagram of a method of building different representations of the Galois Field (GF), indicated generally as 1100, according to some exemplary embodiments of the invention.

Depicted exemplary method 1100 is implemented by logic circuitry and comprises representing 1110 each element of a field GF($2^8$) using a polynomial of degree no higher than 7+d, where d>0 is a redundancy parameter. According to various exemplary embodiments of the invention method 1100 employs d≥9 (1120); d≥12; d≥14; d≥16; d≥18; d≥20; d≥24 (1130); d≥32; d≥48 or intermediate or greater values of d. In some embodiments, method 1100 includes representing 1140 a same field element by one of $2^d$ various ways (pairwise differing by terms that are multiples of P(x)), and at each moment of calculations chooses any of said various representations. In some embodiments, the element of a field includes 1150 a byte of data within a block of a block cipher or a cryptographic key. In actual practice, transformation using the polynomial is only conducted on those elements of the field, or portions thereof, which are being used in calculations.

According to various exemplary embodiments of the invention the block cipher is selected from the group consisting of AES, SM4, and ARIA.

In some embodiments, method 1100 includes computing $X^Y$ by performing a series of: (i) multiplications of two different elements of the field; and (ii) raising an element of the field to a power Z wherein Z is a power of 2. According to these embodiments the number of multiplications (i) is at least two less than the number of ones (1s) in the binary representation of Y. In some embodiments, Y=254. Alternatively or additionally, in some embodiments a number of multiplications (i) is 4 or less.

Mathematical Definition of the Block-Ciphers.

In many block-ciphers (AES, SM4, ARIA) messages are broken into blocks of a predetermined length, and each block is encrypted independently of the others.

Rijndael (AES) is presented here as an example. The common block ciphers SM4 and ARIA are very similar to Rijndael.

Rijndael operates on blocks that are 128-bits in length. There are actually three variants of the Rijndael cipher, each of which uses a different key length. The permissible key lengths are 128, 192, and 256 bits. Even a 128-bit key is large enough to prevent any exhaustive search. Of course, a large key is no good without a strong design.

Within a block, the fundamental unit operated upon is a byte, that is, 8 bits. Bytes are thought of in two different ways in Rijndael. Let the byte be given in terms of its bits as $b_7, b_6, \ldots, b_0$.

Consider each bit as an element in GF(2), a finite field of two elements. First, one may think of a byte as a vector ($b_7, b_6, \ldots, b_0$) $\in$ GF(2)$^8$.

Second, one may think of a byte as an element of GF($2^8$), in the following way: Consider the polynomial ring GF(2) [X]. It is possible to mod out by any polynomial to produce a factor ring. If this polynomial is irreducible, and of degree n, then the resulting factor ring is isomorphic to GF($2^n$). In Rijndael, the irreducible polynomial $q(x)=x^8+x^4+x^3+x+1$, is used to mod out and obtain a representation for GF($2^8$). A byte is then represented in GF($2^8$) by the polynomial $b_7x^7+b_6x^6+\ldots+b_1x+b_0$.

Arithmetic Operations in $F_{256}$

Addition in this representation of $F_{256}$ is simply addition of corresponding 8-vectors over $F_2$, or bitwise addition of coordinates modulo 2, or simply XOR operation in hexadecimal representation.

Multiplication in the field is multiplication of corresponding polynomials over the binary field modulo generating polynomial.

```
// Multiplication in F256
unssigned char Prod_c(const unsigned char x,
    const unsigned char y, const unsigned char P) {
        unsigned char s = 0x01, deg = x;
        unsigned char res = 0;
        do {
            if (s & y) {
                res ^= deg;
            }
            if (deg & 0x80) {
                deg <<= 1;
                deg ^= P;
            }
            else {
                deg <<= 1;
            }
```

```
            s <<= 1;
        }
        while (s && s <= y);
        return res;
}
```

Other algorithms of multiplications are presented, so for easy changing of their usage only shell functions are provided which call only one of the versions.

Exponentiation in $F_{256}$

According to some exemplary methods, to raise a field element to a degree d, d is presented in binary notation, calculation of degrees equal to degrees of two and multiplication of those that correspond to units in binary presentation of d. To calculate degree not more than 255, not more than 14 multiplications are needed.

Inversion in $F_{256}$

Since any element raised to degree 255 is unit (this will be explained hereinbelow), raising an element to degree 254 provides its inverse.

```
// Inversion in F256
// Attention: inversion of zero gives zero
unsigned char Inv_c(const unsigned char x,
    const unsigned char P) {
        return Exp_c(x, 254, P);
}
```

Euclidean Algorithm

Another way to calculate an inverse element is based on a Euclidean algorithm.

The Euclidean algorithm finds the greatest common divisor of two elements of a Euclidean domain. This method is commonly used for natural numbers, but works also on a ring of polynomials. The Euclidean algorithm is based on the following simple observation: If a=bq+r (where q is quotient, and r is residue of division of a to b), then gcd(a,b)=gcd(b,r). Indeed, the division with remainder formula implies that each common divisor of b and r is also a divisor of a, and each common divisor of a and b is also a divisor of r. Hence sets of common divisors of pairs (a, b) and (b, r) coincide, thus their greatest common divisors also coincide.

Using the Euclidean algorithm means successive division with remainder. First, the polynomial of greater degree is divided by the polynomial of lesser degree. At each next step, the divisor of the previous step is divided to the remainder of the previous step until zero remainder is obtained. It is bound to happen because remainders decrease. The last non-zero reminder is the desired greatest common divisor. The procedure of Euclidean algorithm can be written as follows:

$$a = bq_1 + r_1$$

$$b = r_1 q_2 + r_2$$

$$r_1 = r_2 q_3 + r_3$$

$$r_{n-3} = r_{n-2} q_{n-1} + r_{n-1}$$

$$r_{n-2} = r_{n-1} q_n + r_n$$

$$r_{n-1} = r_n q_{n+1}$$

Then $$d = gcd(a,b) = gcd(b,r_1) = \ldots = gcd(r_{n-1}, r_n) = r_n.$$

This calculation provides a partial solution of linear equation $$ax + by = d,$$

where d=gcd(a,b). As a result, $r_1$ can be expressed as a linear combination a and b from the first equation $$r_2 = a - q_1 b.$$

Further $r_2$ can be expressed as a linear combination b and r from the second equation and substituting already known expression for $r_2$ provides an expression for $r_2$. Continuing this procedure, expressions for each residue are calculated:

$$r_k = u_k a + v_k b.$$

It is then easy to find recurrent relations for $u_k$ and $v_k$:

$$u_k = u_{k-2} - u_{k-1} q_k v_k$$

$$= v_{k-2} - v_{k-1} q_k$$

The last pair $(u_n, v_n)$ is a desired solution (x,y).

As an example, the above procedure is applied to the pair (P,a), where P is generating polynomial of a basis of the field $F_{256}$ and a is a non-zero polynomial of degree 7. Since polynomial P is irreducible gcd(P,a)=1. As it was shown above, it is possible to find a solution of the equation $$ax + Py = 1$$

This means that ax=1 mod P

Thus x is inverse element to a in the field $F_{256}$.

Here below function of Euclidean division in the ring of polynomials and function of inversion in the field $F_{256}$.

```
// Residue of division of a polynomial to a polynomial
void Eucl_div(const unsigned long dividend,
    const unsigned long divisor, unsigned long *quotient,
    unsigned long *residue) {
        int i = 0, d = 0;
        unsigned long s = 0x1;
        do {
            if (s & divisor) {
                d = i;
            }
            s<<= 1;
            i++;
        } while (s);
        *residue = dividend;
        *quotient = 0;
        for (i = 31; i >= d; i--) {
            s = 1 << i;
            if (*residue & s) {
                *residue ^= divisor << (i - d);
                *quotient ^= s >> d;
            }
        }
}
// Inversion in F256 (based on euclidean algorithm)
unsigned long Inv_e(const unsigned long x, const unsigned char P) {
    unsigned long r, q, va = 0, vb = 1, vr, a = P ^ 0x100, b = x;
    if (x == 0) return 0;
    do {
        Eucl_div(a, b, &q, &r);
        vr = va ^ Prod(vb, q, P);
        if (r == 0) return vb;
        va = vb;
        vb = vr;
        a = b;
```

```
            b = r;
        }
    while (1);
}
```

Multiplicative Group of $F_{256}$

Multiplicative group of any finite field is cyclic. This means that there exists such an element $x \in F256$ that all its degrees from 0 to 255 are different and therefore contains all field elements except for 0. Thus $x^{255}=1$ and therefore, each element of the field except for 0 raised to degree 255 is 1:

$$(x^d)^{255}=(x^{255})^d=1^d=1.$$

This element x called generated element of multiplicative group (not to be confused with determined above generating element of a basis). The minimal degree to which a field element must be raised to get the unit called its degree. An element is a generating element of multiplicative group if its degree equal to 255. Degree of each element is a divisor of $255=3\cdot 5\cdot 17$. An element $x^d$ is a generating element of multiplicative group if d is relatively prime to 255. There are 128 generating elements of multiplicative group in the field $F_{256}$, they constitute exactly half of set of all elements.

Checking a generating element u of multiplicative group allows consideration of another representation of the field called logarithmic. Each non-zero element $x=u^d(0 \le d < 255)$ where u is a generating element of the multiplicative group, is represented by its logarithm d. Additionally, logarithm of zero is defined as 255. Naturally, the inverse function to logarithm called exponent. The code, which fills tables of exponents and logarithm by given generating element u and generating polynomial P, presented below.

```
// Filling tables of exponents and logarithms
void FillTables(unsigned char *e, unsigned char *1,
    const unsigned char u, const unsigned char P) {
        unsigned char i, s = 1;
        for (1 = 0; i < 255; i++) {
            e[i] = s;
            1[s] = i;
            s = Prod(s, u, P);
        }
        e[255] = 0;
        1[0] = 255;
}
```

Multiplication, Exponentiation and Inversion Using Exponent and Logarithm Tables Logarithmization enables us to transform multiplication to addition. So, using tables of logarithms and exponents presented in the previous subsection it is possible to determine product of field elements without actual calculations. Here below alternative code for multiplication, exponentiation and inversion presented. It is much faster than presented above but needs memory usage for tables storage.

```
// Multiplication in F256
unsigned char Prod_m(const unsigned char a, const unsigned char b,
    const unsigned char *e, const unsigned char *1) {
        if (a == 0 || b == 0) return 0;
        return e[((unsigned short) 1[a]
            + (unsigned short) 1[b]) % 0xff];
}
// Exponentiation in F256
// Attention: zero to degree zero gives zero
```

```
unsigned char Exp_m(const unsigned char x, const unsigned char d,
    const unsigned char *e, const unsigned char *1) {
        if (x == 0) return 0;
        if (x == 1) return 1;
        return e[((unsigned short) d
            * (unsigned short) 1[x]) % 0xff];
}
// Inversion in F256
// Attention: inversion of zero gives zero
unsigned char Inv_m(const unsigned char x,
    const unsigned char *e, const unsigned char *1) {
        if (x == 0) return 0;
        if (x == 1) return 1;
        return e[0xff - 1[x]];
}
```

Linear Algebra Over F2
Action of a Matrix on a Vector

Each element of the field $F_{256}$ is presented as unsigned char interpreted as a row of bits of length 8. Each linear operator in the space $F_{256}$ over $F_2$ is presented as an array unsigned char[8]. Each element of the array is a row of the matrix. Action of an operator to a vector is the product of the operator's matrix and the column (transposed to the vector's row). Here below an auxiliary function calculating Hamming parity and the function of action of a matrix to a vector are presented.

```
// Hamming parity - Sum of the bits of a byte modulo 2
unsigned char Hp(const unsigned char x) {
    unsigned char res = 0, s = 1;
    while (s) {
        if (x & s) res ^= 1;
        s <<= 1;
    }
    return res;
}
// Action of a matrix to a vector in F2
unsigned char Act(const unsigned char *M,
    const unsigned char x) {
        unsigned char res = 0x00;
        int i;
        for (i = 7; i >= 0; i--){
            res <<= 1;
            res ^= Hp(M[i] & x);
        }
        return res;
}
```

Sbox

Function Sbox provides a substitution of a field element, which is composition of inversion and affine transformation. The affine part depends on linear transformation matrix and shift-vector. It and its inverse transformation are determined by the following arrays in standard AES-basis:

Making Sbox includes non-linear substitution first, then— linear transformation, and shift at the end. Obviously, that in Inverse Sbox substitution all inverse components done in the reverse order:

```
// Sbox substitution
const unsigned char SboxPar[9] =
    {0xf1, 0xe3, 0xc7, 0x8f, 0x1f, 0x3e, 0x7c, 0xf8, 0x63};
unsigned char Sbox(const unsigned char b,
    const unsigned char *SboxPar,
    const unsigned char P) {
        return Act(SboxPar, Inv_c(b, P)) ^ SboxPar[8];
}
// Inverse Sbox substitution
const unsigned char InvSboxPar[9] =
```

```
            {0xa4, 0x49, 0x92, 0x25, 0x4a, 0x94, 0x29, 0x52, 0x63};
        unsigned char InvSbox(const unsigned char b.
    }
    const unsigned char *InvSboxPar,
    const unsigned char P) {
        return Inv_c(Act(InvSboxPar, b ^ InvSboxPar[8]), P);
    }
```

Additional Matrix Utilities

Functions of multiplication, transposition and inversion of matrices for the version with changing of the basis are also provided.

```
// Matrix transposition in F2
void Transpose(const unsigned char *orig, unsigned char *tran) {
    unsigned char s = 1;
    int i, j;
    for (i = 0; i < 8; i++) {
        tran[i] = 0x00;
        for (j = 7; j >= 0; j--) {
            tran[i]<<=1;
            if (orig[j] & s) {
                tran[i] ^= 1;
            }
        }
        s <<= 1;
    }
}
// Matrix inversion in F2
int InvMat(const unsigned char *orig, unsigned char *inv) {
    unsigned char s = 1, tmp;
    unsigned char origcopy[8];
    int i, j;
    for (i = 0; i < 8; i++) {
        inv[i] = s;
        origcopy[i] = orig[i];
        s <<= 1;
    }
    for (i = 0; i < 8; i++) {
        s = 1 << i;
        j = i;
        while ((origcopy[j] & s) == 0) && j < 8) j++;
        if (j == 8)
            return -1;
        if (j != i) {
            tmp = origcopy[i];
            origcopy[i] = origcopy[j];
            origcopy[j] = tmp;
            tmp = inv[i];
            inv[i] = inv[j];
            inv[j] = tmp;
        }
        for (j = 1 + 1; j < 8; j++) {
            if (origcopy[j] & s) {
                origcopy[j] ^= origcopy[i];
                inv[j] ^= inv[i];
            }
        }
    }
    for (i = 0; i < 8; i++) {
        for (j = i + 1; j < 8; j++) {
            s = 1 << i;
            if (origcopy[i] & s) {
                origcopy[i] ^= origcopy[j];
                inv[i] ^= inv[j];
            }
        }
    }
    return 0;
}
// Matrix product in F2 (the second factor must be transposed)
void ProdMat(const unsigned char *factor1,
    const unsigned char *factor2, unsigned char *prod) {
    int i, j;
    for (j = 0; j < 8; j++) {
        prod[j] = 0;
    }
    for (i = 7; i >= 0; i--) {
        for (j = 0; j < 8; j++) {
            prod[j] <<= 1;
            prod[j] ^= Hp(factor1[j] & factor2[i]);
        }
    }
}
```

Calculation of the Generating Polynomial Corresponding to an Arbitrary Field Element

```
unsigned char GenPol (unsigned char x, unsigned char P) {
    unsigned char b[9], a[9], s, tmp;
    int i, j;
    a[0] = 1;
    b[0] = 1;
    for (i = 1; i <= 8; i++) {
        a[i] = Prod_c(a[i - 1], x, P);
        b[i] = b[i - 1] << 1;
    }
    for (i = 0; i <= 8; i++) {
        s = 1 << 1;
        j = 1;
        while (((a[j] & s) == 0) && j <= 8) j++;
        if (j == 9)
            continue;
        if (j != i) {
            tmp = a[i];
            a[i] = a[j];
            a[j] = tmp;
            tmp = b[i];
            b[i] = b[j];
            b[j] = tmp;
        }
        for (j = i + 1; j <= 8; j++) {
            if (a[j] & s) {
                a[j] ^= a[i];
                b[j] ^= b[i];
            }
        }
    }
    for (i = 0; i < 8; i++) {
        if (a[i] == 0) return 0;
    }
    return b[8];
}
```

Note that in SM4 and ARIA, the representations are very similar: For example for AES and ARIA the irreducible polynomial is $$q(x)=x^8+x^4+x^3+x+1.$$

For SM4 there is another polynomial $$q_{SM4}(x)=x^8+x^7+x^6+x^5+x^4+x^2+1.$$

It is also convenient to refer to bytes (in either setting) by their hexadecimal representations. Of course, it is possible to define polynomial rings over $GF(2^8)$. Later on, the ring $GF(2^8)[y]/(y^4+1)$ will be used. Note that while this is not a field (as $y^4+1$ is not irreducible in $GF(2^8)[y]$ being equal to $(y+1)^4$), elements are invertible if they are coprime to $y^4+1$, that is, if they are not divisible by y+1.

SubBytes

One of AES-primitives for encoding is SubBytes—Sbox function applied to a block of 16 bytes.

```
// SubBytes (Sbox applied to a block 4x4 bytes)
void SubBytes(const unsigned long *State_w,
    const unsigned char *SboxPar, const unsigned char P) {
        unsigned char *State = (unsigned char*) State_w;
```

```
        int i;
        for (i = 0; i < 16; i++) {
            State[i] = Sbox(State[i], SboxPar, P);
        }
    }
    // InvSubBytes (InvSbox applied to a block 4x4 bytes)
    void InvSubBytes(const unsigned long *State_w,
    const unsigned char *InvSboxPar, const unsigned char P) {
        unsigned char *State = (unsigned char*) State_w;
        int i;
        for (i = 0; i < 16; i++) {
            State[i] = InvSbox(State[i], InvSboxPar, P);
        }
    }
        Also Key Extension function needs SubBytes
        applied to a word (4 bytes)
    // Sbox applied to a word
    void SboxWord(unsigned char *Data,
    const unsigned char *SboxPar, const unsigned char P) {
        int i;
        for (i = 0; i < 4; i++) {
            Data[i] = Sbox(Data[i], SboxPar, P);
        }
    }
```

ShiftRows

Function ShiftRows makes cyclic shift of State's rows— each one to its own value. Here are codes for this function and its inverse.

```
    // ShiftRows - the second step of AES round
    void ShiftRows(unsigned long *State_w) {
        unsigned char *State = (unsigned char*) State_w;
        unsigned char tmp;
        tmp = State[1];
        State[1] = State[5];
        State[5] = State[9];
        State[9] = State[13];
        State[13] = tmp;
        tmp = State[2];
        State[2] = State[10];
        State[10] = tmp;
        tmp = State[6];
        State[6] = State[14];
        State[14] = tmp;
        tmp = State[15];
        State[15] = State[11];
        State[11] = State[7];
        State[7] = State[3];
        State[3] = tmp;
    }
        // InvShiftRows - reverse operation to ShiftRows
        void InvShiftRows(unsigned long *State_w) {
            unsigned char *State = (unsigned char*) State_w;
            unsigned char tmp;
            tmp = State[13];
            State[13] = State[9];
            State[9] = State[5];
            State[5] = State[1];
            State[1] = tmp;
            tmp = State[10];
            State[10] = State[2];
            State[2] = tmp;
            tmp = State[14];
            State[14] = State[6];
            State[6] = tmp;
            tmp = State[3];
            State[3] = State[7];
            State[7] = State[11];
            State[11] = State[15];
            State[15] = tmp;
        }
```

MixColumns

Function MixColumns is the third step of an AES-round. It makes linear transformation over each State's column (word) which can be interpreted in the standard AES-basis as multiplication of a polynomial of degree not more than 4 to the polynomial $P(x)=3x^3+x^2+x+2$ modulo $X^4+1$. The inverse function is the same; the difference is only in received parameters that are coefficients of the inverse polynomial (modulo $x^4+1$).

Thus, codes for MixColumns function and the inverse one are the same, but they receive different parameters.

```
    const unsigned char MixColPar[4] = {0x02, 0x01, 0x01, 0x03};
    const unsigned char InvMixColPar[4] = {0x0e, 0x09, 0x0d, 0x0b};
    // MixColumns - the third step of AES round
    void MixColumns(unsigned long *State_w,
    const unsigned char *MixColPar, const unsigned char P) {
        unsigned char res[4];
        unsigned char *State = (unsigned char*) State_w;
        int i, j, k;
        for (i = 0; i < 4; i++) {
            for (j = 0; j < 4; j++) {
                res[j] = 0x00;
                for (k = 0; k < 4; k++) {
                    res[j] ^= Prod_c(MixColPar[(4 - k + j) & 0x03],
                    State[i * 4 + k], P);
                }
            }
            for (j = 0; j < 4; j++) {
                State[i * 4 + j] = res[j];
            }
        }
    }
```

InvMixCol function involves substitution of parameter Inv-MixColPar" for MixColPar".

AddRoundKey

And the last step of an AES-round is AddRoundKey. It makes XOR of State with RoundKey, is involutive (inverse to itself) and does not accept any parameters.

```
    // AddRoundKey - the fourth step of AES round
    void AddRoundKey(unsigned long *State,
    const unsigned long *RoundKey) {
        int i;
        for (i = 0; i < 4; i++) {
            State[i] ^= RoundKey[i];
        }
    }
```

RotWord

The RotWord function is used in function KeyExpansion. It shifts cyclic a word to one byte.

```
    // Rotation of a word for one byte
    unsigned long RotWord(const unsigned long Word) {
        return (Word << 24) ^ (Word >> 8);
    }
```

Putting it Together

AES

AES-coding operates with a block called State of size 16 bytes. Each its byte has been interpreted as an element of finite field $F_{256}$ Each element of finite field $F_{256}$, presented in polynomial base determined by irreducible polynomial $P(x)=x^8+x^4+x^3+x+1$. This means that the lowest bit is constant term, the lowest but one bit is coefficient at linear term, the lowest but two bit is coefficient at quadratic term, and so on. Addition operation is ordinary addition of polynomials (or the same—bitwise XOR of the bytes-summands) and multiplication operation is multiplication of polynomials modulo $P(x)$.

The calculations use parameters that are contained in a special structure:

```
struct AESparam {
    unsigned char Base;
    unsigned char Polynomial;
    unsigned char RconFactor;
    unsigned char SboxPar[9];
    unsigned char InvSboxPar[9];
    unsigned char MixColPar[4];
    unsigned char InvMixColPar[4];
} Param = {0x03, 0x1b, 0x02,
{0xf1, 0xe3, 0xc7, 0x8f, 0x1f, 0x3e, 0x7c, 0xf8, 0x63},
{0xa4, 0x49, 0x92, 0x25, 0x4a, 0x94, 0x29, 0x52, 0x63},
{0x02, 0x01, 0x01, 0x03}, {0x0e, 0x09, 0x0d, 0x0b}};
```

Further the section "Calculations in different bases" shows how the parameters are changed when transition to another basis occurs.

Key Expansion

```
// Key expansion function for AES
void KeyExpansion(unsigned long *Key,
const struct AESparam *Param, const int Nk, const int NkExt) {
    unsigned char Rcon = 1;
    int i;
    for (i = Nk; i < NkExt; i++) {
        if (i % Nk) {
            Key[i] = Key[i - 1];
            if ((Nk > 6) && (i % Nk) == 4) {
                SboxWord((unsigned char*) (Key + i),
                Param->SboxPar, Param->Polynomial);
            }
        }
        else {
            Key[i] = RotWord(Key[i-1]);
            SboxWord((unsigned char*) (Key + i),
            Param->SboxPar, Param->Polynomial);
            Key[i] ^= ((unsigned long) Rcon);
            Rcon = Prod_c(Rcon, Param->RconFactor,
            Param->Polynomial);
        }
        Key[i] ^= Key[i - Nk];
    }
}
```

Encoding

```
void Encoding_AES(unsigned long *State,
const unsigned long *Key,
const struct AESparam *Param, const int Nr) {
    int Round;
    AddRoundKey(State, Key);
    for (Round = 1; Round < Nr; Round++) {
        SubBytes(State, Param->SboxPar, Param->Polynomial);
        ShiftRows(State);
        MixColumns(State, Param->MixColPar, Param->Polynomial);
        AddRoundKey(State, Key + Round * 4);
    }
    ShiftRows(State);
    SubBytes(State, Param->SboxPar, Param->Polynomial);
    AddRoundKey(State, Key + Nr * 4);
}
```

Decoding

```
// Decoding function for AES
void Decoding_AES(unsigned long *State, const unsigned long *Key,
const struct AESparam *Param, const int Nr) {
    int Round;
    AddRoundKey(State, Key + Nr * 4);
    InvSubBytes(State, Param->InvSboxPar, Param->Polynomial);
    InvShiftRows(State);
    for (Round = Nr - 1; Round > 0; Round--) {
        AddRoundKey(State, Key + Round * 4);
        MixColumns(State, Param->InvMixColPar, Param->Polynomial);
        InvShiftRows(State);
        InvSubBytes(State, Param->InvSboxPar, Param->Polynomial);
    }
    AddRoundKey(State, Key);
}
```

Possible Representation of the Galois Field $GF(2^8)$ Using the Tower Fields Approach There are many approaches to represent the Galois Field $GF(2^8)$. Among them, the tower fields approach, that is the technique which converts the original field $GF(2^8)$ into an equivalent tower field, such as tower fields $GF(((2^2)^2)^2)$ or $GF((2^4)^2)$.

One can propose two types of bases for such representations.

A general element G of $GF(2^8)$ can be represented as the linear polynomial (PB) (in y) over $GF(2^4)$, denote: $G=\gamma_1(y)+\gamma_0$, with multiplication modulo an irreducible polynomial $r(y)=y^2+\tau y+v$. All the coefficients are in the 4-bit subfield $GF(2^4)$. So, the pair $[\gamma_1,\gamma_0]$ represents G in terms of a polynomial basis [Y, 1], where Y is one root of r(y).

Alternatively, one can use the normal basis (NB) $[Y^{16},Y]$ engaging both roots of r(y). Note that $r(y)=y^2+\tau y+v=(y+Y)(y+Y^{16})$.

Furthermore, $GF(2^4)$ can be similarly represented as a set of the linear polynomials (in z) of the form $\gamma=\Gamma_1 z+\Gamma_0$ over $GF(2^2)$, with multiplication modulo an irreducible polynomial $s(z)=z^2+Tz+N$, with all the coefficients in $GF(2^2)$. Again, this uses a polynomial basis [Z, 1], where Z is one root of s(z); or the normal basis $[Z^4,Z]$ could be used.

Finally, $GF(2^2)$ can be represented as linear polynomials (in w) of the form $\Gamma=g_1 w+g_0$, over GF(2), with multiplication modulo $t(w)=w^2+w+1$, where $g_1$ and $g_0$ are single bits. This uses a polynomial basis [W, 1], with W one root of t(w); or a normal basis $[W^2, W]$.

The above bases (i.e., PB and NB) represent each element of $GF(2^m)$ using m bits in a non-redundant manner However, there are two redundant representations, namely, Polynomial Ring Representation (PRR) and Redundantly Represented Basis (RRB), which use n(>m) bits to represent each element of $GF(2^m)$. The modular polynomial of these redundant representations is given by an n-degree reducible polynomial, whereas that of non-redundant representations is given by an m-degree irreducible polynomial. This means that redundant representations provide even a wider variety of polynomials that can be selected as a modular polynomial than non-redundant representations.

How Many Such Representations Exist?

For example, in the non-redundant case, consider all of the subfield polynomial and normal bases that had a trace of unity. There are eight choices for the norm v that make $r(y)=y^2+y+v$ to be irreducible over $GF(2^4)$, and two choices for N that make the polynomial $s(z)=z^2+z+N$ to be irreducible over $GF(2^2)$. Each of these polynomials r(y), s(z), and t(w) has two distinct roots, and for a polynomial basis either can be chosen, or for a normal basis both can be used. So altogether there are $$(8*3)*(2*3)*(1*3)=432$$

possible cases (including the all-polynomial case).

Calculation of an Inverse Element in Galois Field Using the Ttower Fields Approach For the completeness of the description, an explanation on how to implement the circuit for the calculation of the inverse element in tower fields is presented.

The representations described above allow operations in $GF(2^8)$ to be expressed in terms of simpler operations in $GF(2^4)$, which in turn are expressed in the simple operations of $GF(2^2)$. In each of these fields, addition (the same operation as subtraction) is just bitwise XOR, for any basis.

In $GF(2^8)$ with a polynomial basis, multiplication mod $y^2+\tau y+v$ is given by $$(\gamma_1 y+\gamma_0)(\delta_1 y+\delta_0)=(\gamma_1\delta_0+\gamma_0\delta_1+\gamma_1\delta_1\tau)y+(\gamma_0\delta_0+\gamma_1\delta_1 v).$$

From this, it is easy to verify that the inverse is given by $$(\gamma_1 y+\gamma_0)^{-1}=[\theta^{-1}\gamma_1]y+[\theta^{-1}(\gamma_0+\gamma_1\tau)],$$

where $\theta=\gamma_1^2 v+\gamma_1\gamma_0\tau+\gamma_0^2$.

So, finding an inverse in GF ($2^8$) reduces to an inverse and several multiplications in $GF(2^4)$. Analogous formulas for multiplication and inversion apply in $GF(2^4)$.

Simpler versions apply in $GF(2^2)$, where the inverse is the same as the square (for $\Gamma \in GF(2^2)$, $\Gamma^{-1}=\Gamma$); note then that a zero input gives a zero output, so that special case is handled automatically.

The details of these calculations change if a normal basis is used at each level. In $GF(2^8)$, recall that both $Y$ and $Y^{16}$ satisfy $y^2+\tau y+v=0$, where $\tau=Y^{16}+Y$ and $v=(Y^{16})Y$, so $1=\tau^{-1}(Y^{16}+Y)$. Then multiplication becomes $$(\gamma_1 Y^{16}+\gamma_0 Y)(\delta_1 Y^{16}+\delta_0 Y)=[\gamma_1\delta_1\tau+\theta]Y^{16}+[\gamma_0\delta_0+\theta]Y,$$

where $\theta=(\gamma_1+\gamma_0)(\delta_1+\delta_0)v\tau^{-1}$, and the inverse is $$(\gamma_1 Y^{16}+\gamma_0 Y)^{-1}=[\theta^{-1}\gamma_0]Y^{16}+[\theta^{-1}\gamma_1]Y,$$

where $\theta=\gamma_1\gamma_0\tau^2+(\gamma_1^2+\gamma_0^2)v$.

Again, finding an inverse in $GF(2^8)$ involves an inverse and several multiplications in $GF(2^4)$, and analogous formulas apply in the subfields.

Changing of Bases During AES

One approach is to convert each byte of the input block once and do all of the

AES algorithm in the new form, only converting back at the end of all the rounds. Since all the arithmetic in the AES algorithm is Galois arithmetic, works provided the key was appropriately converted as well.

Another approach is as follows:

The affine transformation can be combined with the basis change. One can change into the subfield basis on entering the S-box and to change back again on leaving it.

Transformation engine 610 (FIG. 6) applies one or the other of these approaches in different embodiments of the invention.

Each change of basis means multiplication by an 8×8-bit transformation matrix. Letting X refer to the transformation matrix that converts from the subfield basis to the standard basis, then to compute the S-box function of a given byte, first a bit-matrix multiplication by $X^{-1}$ is done to change into the subfield basis, then calculate the Galois inverse by subfield arithmetic, then change basis back again with another bit matrix multiplication, by X. This is followed directly by the affine transformation, which includes another bit-matrix multiplication by the constant matrix M. (This can be regarded as another change of basis, since M is invertible.) So, it is possible to combine the matrices into the product MX. Then adding the constant b completes the S-box function.

The inverse S-box function is similar, except the XOR with constant b comes first, followed by multiplication by the bit matrix $(MX)^{-1}$. Then after finding the inverse, conversion back to the standard basis through multiplication by the matrix X is performed.

Common HW Logic for Many Different Representations of $GF(2^8)$

Consider the representations that use the same type of basis, for example, these that use only the normal basis, or these that use the polynomial basis. The logics of s-box, and other linear components of the block-ciphers depends only on the type of the representation and does not depend on the basis and thus can be realized by one common block. So the whole logic of the cipher consists of one (or more) common block depending on how many types of the representations are included and for each type there are $$\frac{m(m-1)}{2}$$

blocks for the transfer matrixes. Recall that a transformation matrix is a bit matrix of dimension 8*8. HW block for each such matrix consists of few tens of logics gates (there are many methods for optimizations, for example extracting the common factors). Thus if the design includes m different realization of the same type the number of gates needed estimated as approximately m²*30. To this amount the size of the common block which is approximately 5-10K gates should be added. It is possible to optimize the required number of gates by including two or more different types of the representations. In such a way, the size of the footprint of the whole logic can be approximated by the following formula:

$$\sum_{i=1}^{k}\frac{dm_i^2}{2}+n_i,$$

where k is a number of different representations, $n_i$ is the size of a common block for each type of representation (polynomial or normal), d—is an average size of a bit transformation matrix. d≈30, $n_i$≈5000, and $m_i$—is a number of representations of type i.

So, if one takes $m_1=15$, $m_2=15$, k=2 (means 15 representations in the normal basis and 15 in the polynomial basis). It is about 16K gates, which is the same order as a regular realizations of AES.

If $m_1=100$, $m_2=100$, k=2 (means 100 representations in the normal basis and 100 in the polynomial basis, then the order of the required number of gates is approximately 300K gates, which can still be acceptable for some projects.

The Algorithm: Combining all Together

If u and $u^0$ are two representations of a same element in different basis with generating polynomials P and $P^0$ respectively, they are related by $u^0$=Mu where M is transposition matrix.

To calculate transposition of a matrix basis elements of the second basis $\{1, P^0, P^{02}, \ldots, P^{07}\}$ are expressed in the first one $\{1, P, P^2, \ldots, P^7\}$. This yields matrix $(M^*)^{-1}$ which is inverse and transposed to the desired transposition matrix M.

```
// Generation of transition matrix
//(actually it appears inversed and transposed)
void MkTrMatGen(unsigned char *TrMat, const unsigned char u,
const unsigned char P) {
    unsigned char s = 1;
    int i;
    for (i = 0; i < 8; i++) {
        TrMat[i] = s;
        s = Prod_c(s, u, P);
    }
}
```

Here is a function which calculates transpose matrix and parameters while changing basis.

```
// Calculation of parameters for Key Expansion
// and AES encoding/decoding
int ParamCalc(const unsigned char mask, struct AESparam *UParam,
unsigned char *M, unsigned char *MR) {
    const unsigned char SboxPar[9] =
        {0xf1, 0xe3, 0xc7, 0x8f, 0x1f, 0x3e, 0x7c, 0xf8, 0x63};
    const unsigned char InvSboxPar[9] =
        {0xa4, 0x49, 0x92, 0x25, 0x4a, 0x94, 0x29, 0x52, 0x63};
    const unsigned char MixColPar[4] = {0x02, 0x01, 0x01, 0x03};
    const unsigned char InvMixColPar[4] = {0x0e, 0x09, 0x0d, 0x0b};
    const unsigned char RconFactor = 0x02;
    unsigned char MTR[8], M1[8], M1T[8];
    int i;
    UParam->Base = mask;
    UParam->Polynomial = GenPol[mask, 0x1b];
    if (UParam->Polynomial == 0) return -1;
    MkTrMatGen(MTR, UParam->Base, 0x1b);
    Transpose(MTR, MR);
    InvMat(MR, M);
    ProdMat(SboxPar, MTR, M1);
    Transpose(M1, M1T);
    ProdMat(M, M1T, UParam->SboxPar);
    ProdMat(InvSboxPar, MTR, M1);
    Transpose(M1, M1T);
    ProdMat(M, M1T, UParam->InvSboxPar);
    for (i = 0; i < 4; i++) {
        UParam->MixColPar[i] = Act(M, MixColPar[i]);
        UParam->InvMixColPar[i] = Act(M, InvMixColPar[i]);
    }
    UParam->SboxPar[8] = Act(M, SboxPar[8]);
    UParam->InvSboxPar[8] = Act(M, InvSboxPar[8]);
    UParam->RconFactor = Act(M, RconFactor);
    return 0;
}
```

Choose k=2 different types of representations ($10 \le m_{1,2} \le 100$) different bases (representations of each type) for $GF(2^m)$. Denote them by $R_1^{1,2}, R_2^{1,2}, \ldots, R_{m_1}^{1,2}$.

Recall, that each change of basis means multiplication by an 8×8 bit matrix. Denote by $T_{i,j}$ a matrix that converts from the subfield basis i to the subfield basis j.

For the first approach:
1. For each AES round r, $1 \le r \le 11$, choose a basis $0 \le i_r < m_1 + m_2$,
2. At the beginning convert each byte of the result of the previous round or of the input block to the basis $i_r$, applying $T_{i_{r-1}, i_r}(a_j)$, $0 \le j \le 15$.
3. Appropriately convert the round key to the same basis as well.
4. Do the whole round of AES algorithm in the new basis.

In this approach, neither the key nor the real data appear in the calculations of the AES, only in the calculations related to the transformation matrix and thus key and data do not interact with each other.

For the second approach:
1. For each AES round r, $1 \le r \le 11$, choose a basis $0 \le i_r \le m_1 + m_2$, 2. Convert the key and the data to the basis $i_1$ right before entering the s-box calculation. Calculate the Galois inverse by subfield arithmetic, then change basis again with another transformation bit matrix multiply, by $T_{i_1,i_2}$. This is followed directly by the affine transformation, which includes another bit-matrix multiply by the constant matrix M. (This can be regarded another change of basis, since M is invertible.) So the matrices can be combined into the product $MT_{i_1,i_2}$. Then adding the constant b also converted to $R_2$ completes the S-box function.
3. Repeat for each round.

In this approach, again neither the key nor the real data appearing the calculations of the AES, only in the calculations related to the transformation matrix and thus key and data do not interact with each other.

Conclusions:
1. By this method of AES implementation, the key value is completely hidden during the calculations of AES.
2. Even in the first round, the number of different possibilities of the key is between 10 (8K gates) and 100 (80K gates) depends on the choice of $m_1$ and $m_2$. It means that the level of noise the attacker will have 10-100 times bigger than in the attack on the regular implementation. Thus, the factor of a number of traces required to remove the noise will be square of the factor of noise, in other words, it will be between 100 (for 10 representations) and 10000 (for 100 representations). Such a design will be depending by the configuration resist the attacks that involve between 1 and 100 million of traces.
3. Another security measure is for different batches of produced chips to include different set of the representations of the $GF(2^8)$.

Calculation with Redundancy
Redundancy Masking

In standard representation, each element of the field F256 is a polynomial of degree not more than 7. In some embodiments, redundancy d is added to represent an element as polynomial of degree not more than 7+d. Two polynomials represent the same field element if they are equal modulo generating polynomial P(x). According to various exemplary embodiments of the invention redundancy values $0 \le d \le 24$ are employed.

Here is a version with redundancy little bit modified multiplication function. It reduces the result to degree 7+r instead of 7 in the standard version.

```
// Multiplication in F256 using representation with redundancy
unsigned long Prod_r(const unsigned long x,
const unsigned long y,
    const unsigned char P, const unsigned char redund) {
    unsigned long s = 0x1, limit = 1 << (redund + 8), deg = x;
    unsigned long res = 0;
    do {
        if (s & y) {
            res ^= deg;
        }
        deg <<= 1;
        if (deg & limit) {
            deg ^= (P << redund);
            deg &= limit - 1;
        }
        s <<= 1;
    } while (s && s <= y);
    return res;
}
```

Also in this version, the feature of changing of a polynomial to an

-continued

```
equivalent one is available.
    // Change Block elements to an equivalent ones
    void AddNoise(unsigned long *Block,
        const int redund, unsigned char P) {
        unsigned char limit = 1 << redund;
        int i;
        for (i = 0; i < 16; i++) {
            Block[i] ^= Prod(rand( ) & (limit - 1), P ^ 0x100, P);
        }
    }
```

In addition, the last difference is that each data element determined as unsigned long instead of unsigned char. Therefore, the headers of all functions are changed.

Multiplication and Inversion with Redundancy

A version with redundancy slightly modified multiplication function is provided. It reduces the result to degree 7+r instead of 7 in the standard version. In the standard version $x^8$ is changed to $x^8+P(x)$. In the redundancy version $x^{limit}$ is changed to $(x^8+P(x))x^{limit-8}$.

```
// Multiplication in F256 using representation with redundancy
unsigned long Prod_r(const unsigned long x, const unsigned long y,
    const unsigned char P, const unsigned char redund) {
    unsigned long s = 0x1, limit = 1 << (redund + 8), deg = x;
    unsigned long res = 0;
    do {
        if (s & y) {
            res ^= deg;
        }
        deg <<= 1;
        if (deg & limit) {
            deg ^= (P << redund);
            deg &= limit - 1;
        }
        s <<= 1;
    } while (s && s <= y);
    return res;
}
```

Since inversion operation is actually exponentiation, it is reduced to multiplication.

Cyclic Basis

A special case of arithmetic with redundancy is arithmetic in cyclic bases. Cyclic bases provide calculation modulo a multiple of the generating polynomial of the form $x^c+1$. It is possible to set as c the order of the generating element, which in $GF(2^8)$ is always a divisor of 255. The minimal possible value is c=17, that is reached for example for the polynomial $x^8+x^7+x^6+x^4+x^2+x+1$. Below is a multiplication function in a cyclic basis.

```
// Multiplication in F256 using cyclic basis
unsigned long Prod_q(const unsigned long x,
    const unsigned long y, const unsigned char c) {
    unsigned long s = 0x1, limit = (1 << c) - 1,
    deg = x, res = 0;
    do {
        if (s & y) {
            res ^= deg;
        }
        s <<= 1;
        if (s == 0 || s > y) break;
        deg = (deg << 1 ^ deg >> (c - 1)) & limit;
    } while (1);
    return res;
}
```

Linear Transformation with Redundancy

Linear transformations with redundancy can be performed in any basis using the same algorithm, with different parameter values that depend on the choice of the basis. In particular, the coefficients of the affine transformation with redundancy for Sbox and InvSbox, and coefficients for MixColumns and InvMixColumns depend on the choice of the basis. Below is the structure of parameters calculated for the version with redundancy, and a sample set of values for it.

```
struct AESparam {
    unsigned char Base;
    unsigned char Redund;
    unsigned char Polynomial;
    unsigned char RconFactor;
    unsigned long SboxPar[9];
    unsigned long InvSboxPar[9];
    unsigned long MixColPar[4];
    unsigned long InvMixColPar[4];
}
Param = {0x03, 23, 0x1b, 0x02,
    {0x8b82a9f1, 0x170553e3, 0x553e16c7, 0xd1489c8f,
     0xa291391f, 0x3e16c33e, 0x7c2d867c, 0xf85b0cf8, 0x63},
    {0x9373d9a4, 0x26e7b349, 0x4dcf6692, 0xe0aa7c25,
     0xba60494a, 0x0ff42394, 0x64dcf629, 0xc9b9ec52, 0x05},
    {0x02, 0x01, 0x01, 0x03}, {0x0e, 0x09, 0x0d, 0x0b}};
```

Additional Exemplary IP Core

Figure 12:
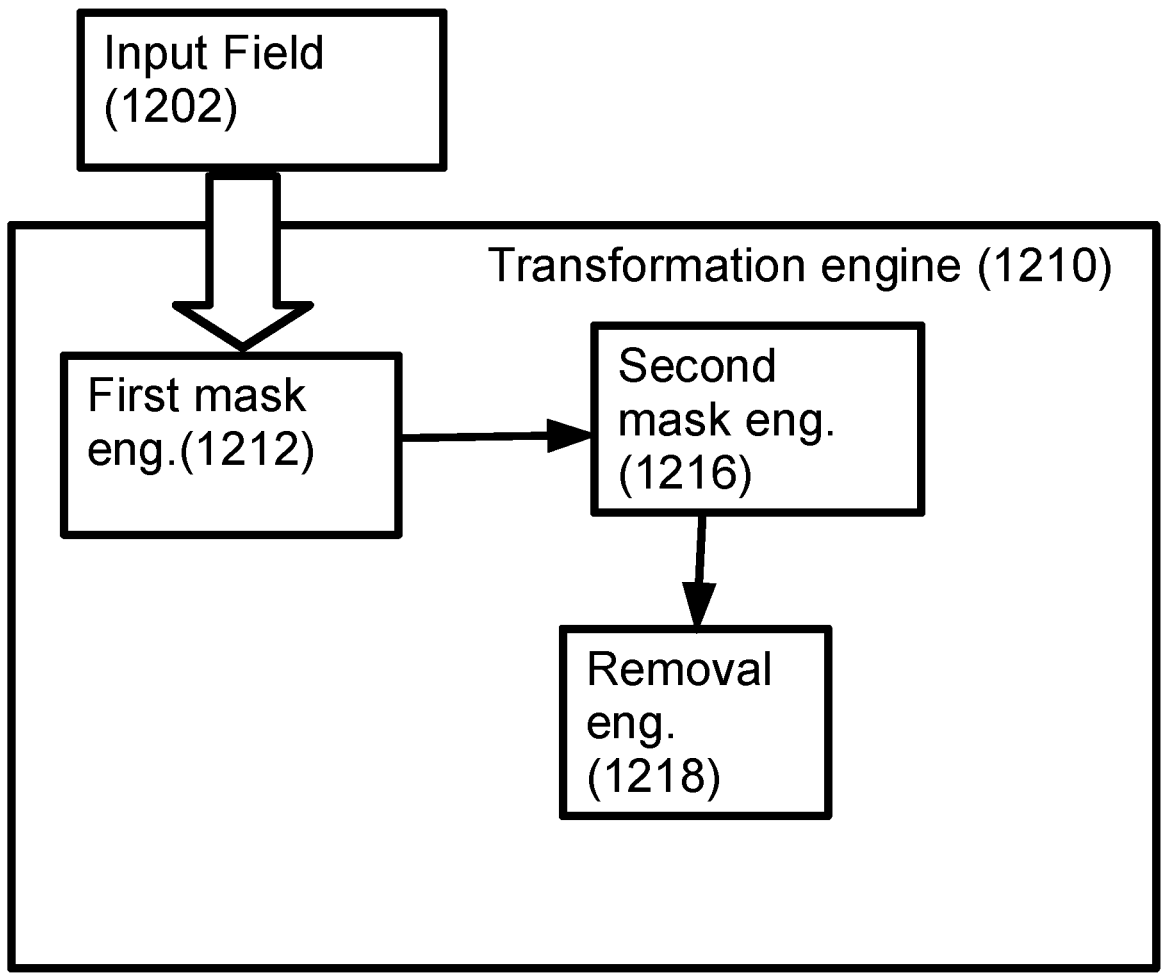
FIG. 12 is a simplified schematic representation of an IP core according to some exemplary embodiments of the invention.

FIG. 12 is a simplified schematic representation of an IP core, indicated generally as 1200, according to some exemplary embodiments of the invention.

Depicted exemplary IP core 1200 includes a transformation engine 1210 which receives a Galois field 1202 as an input.

Depicted exemplary transformation core 1210 includes a first mask application engine 1212. In some exemplary embodiments of the invention, first mask engine 1212 applies an additive mask to input field 1202. Examples of additive masks include but are not limited to XOR random or application of commutative matrices. The output of first mask engine 1212 is a transformed Galois field.

Second mask engine 1216 is adapted to apply a second mask prior to performance of any non-linear calculation. In some exemplary embodiments of the invention, the second mask is a redundancy mask. In some exemplary embodiments of the invention, the redundancy mask represents each element of input field 1202 using a polynomial of degree no higher than 7+d, where d>0 is a redundancy parameter (See FIG. 10 and explanatory text for details). According to various exemplary embodiments of the invention d≥9 and/or d≥24.

In actual practice, first mask engine 1212 and second mask engine 1216 mask only those elements of input field 1202, or portions thereof, which are being used in calculations.

In other exemplary embodiments of the invention, the redundancy mask transforms a byte of data within a block of a block cipher and a cryptographic key from one representation of a Galois Field (GF) to another representation of the GF (See FIG. 6 and explanatory text for details).

Depicted exemplary transformation core 1210 also includes a removal engine 1218 adapted to remove the first mask after the second mask is in place and prior to performance of any non-linear calculation. In some exemplary embodiments of the invention, this prevents an intermediate value from being revealed because there is always at least one mask in place. Alternatively or additionally in some embodiments, removal engine 1218 removes the second mask when all calculations are complete. According to various exemplary embodiments of the invention the IP core is implemented in the context of block ciphers including, but not limited to, AES and/or SM4 and/or ARIA.

Using this strategy, an element u has a representation with a redundancy mask of $u+r_d p$. Adding an additive mask, produces representation $u+r_d p+r_8$. Removing the redundancy mask provides representation $u+r_8$ which is the element masked by an additive mask without revealing u in interim results.

Additional Exemplary Method

Figure 13:
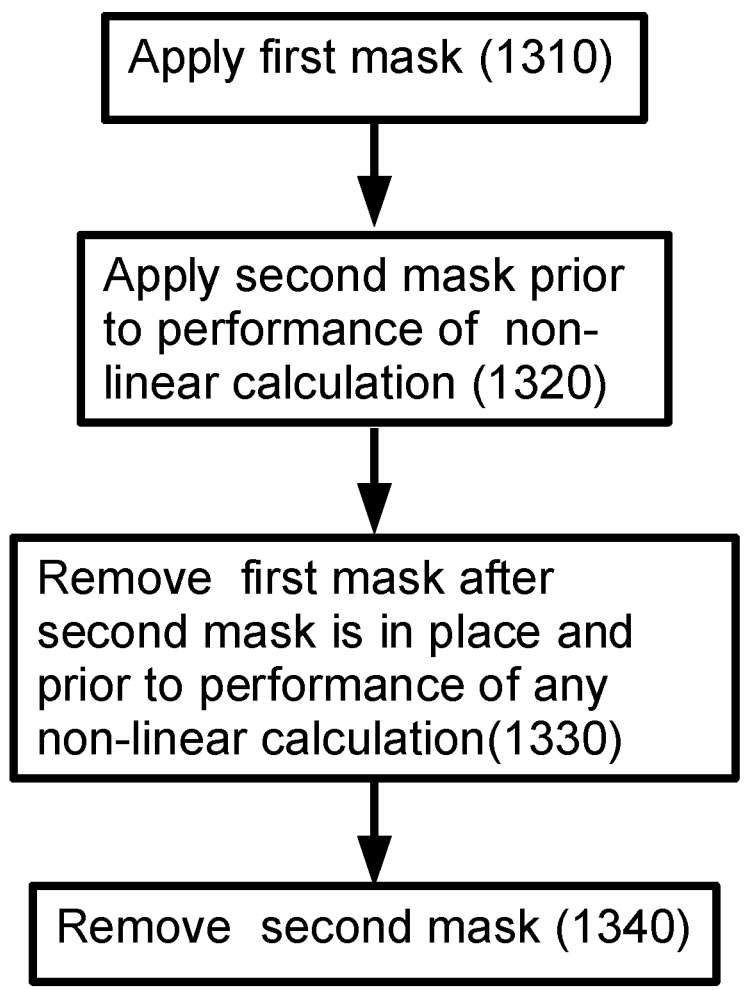
FIG. 13 is a simplified flow diagram of a method according to some exemplary embodiments of the invention.

FIG. 13 is a simplified flow diagram of a masking method, indicated generally as 1300 according to some exemplary embodiments of the invention.

Depicted exemplary method 1300 is implemented by logic circuitry and includes applying 1310 a first mask; applying 1320 a second mask prior to performance of any non-linear calculation; removing 1330 the first mask after the second mask is in place and prior to performance of any non-linear calculation; and removing 1340 the second mask.

In actual practice, applying 1310 and applying 1320 is done on only those elements of the field, or portions thereof, which are being used in calculations.

In some exemplary embodiments of the invention, performance of method 1300 prevents an intermediate value from being revealed because there is always at least one mask in place.

As explained in detail hereinabove in the context of FIG. 12, in some embodiments, the second mask is a redundancy mask.

As explained in detail hereinabove in the context of FIG. 12, in some embodiments, the first mask is an additive mask.

According to various exemplary embodiments of the invention method 1300 is performed in the context of block ciphers including, but not limited to, AES and/or SM4 and/or ARIA.

Additional exemplary method

Figure 14:
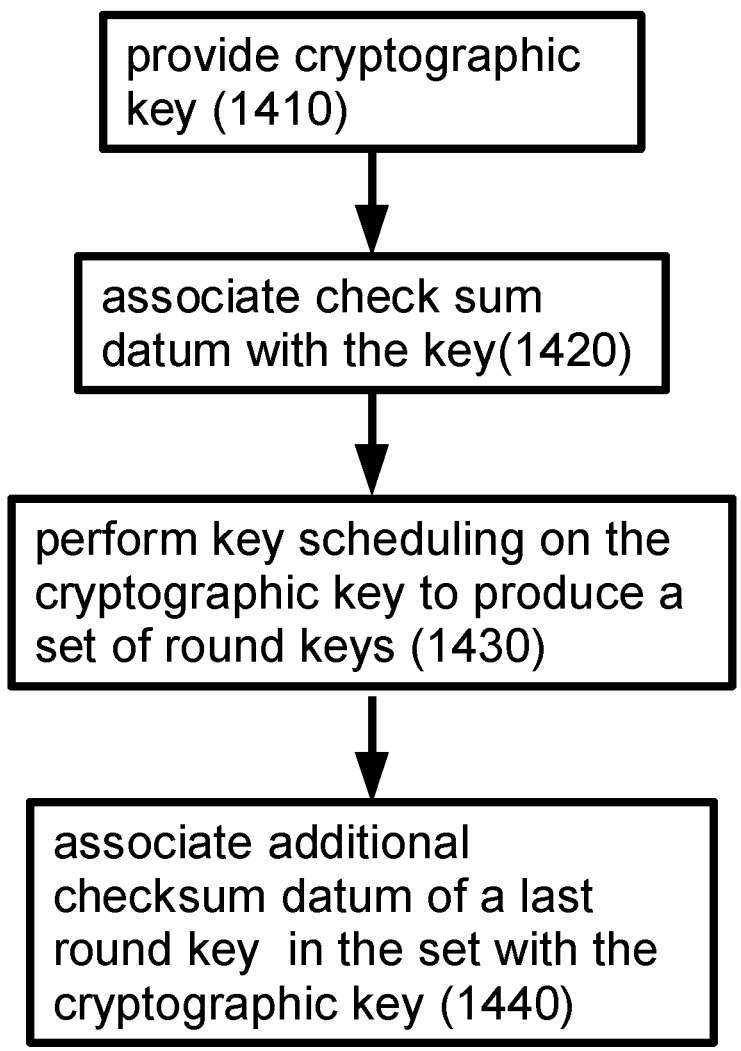
FIG. 14 is a simplified flow diagram of a method according to some exemplary embodiments of the invention.

FIG. 14 is a simplified flow diagram of a method, indicated generally as 1400, according to some exemplary embodiments of the invention. Depicted exemplary method 1400 includes providing 1410 a cryptographic key; and associating 1420 a check sum datum with the key. In some embodiments, practice of method 1400 contributes to an ability to resist fault injection and/or read by write attacks. In some embodiments, the key includes at least 64 bits. Alternatively or additionally, in some embodiments the key includes at least 128 bits. According to various exemplary embodiments of the invention the check sum datum is in a format selected from the group consisting of cyclic redundancy check (CRC), Fletcher's checksum, Adler-32, SAE J1708, longitudinal parity check, Hash function and error detection code. It is expected that other checksum datum formats will be developed during the life of this patent and their use in the context of method 1400 is included a priori.

In some exemplary embodiments of the invention, method 1400 includes performing 1430 key scheduling on said cryptographic key to produce a set of round keys and Associating 1440 an additional checksum datum of a last round key in the set of round keys with the cryptographic key.

Additional Exemplary Method

Figure 15:
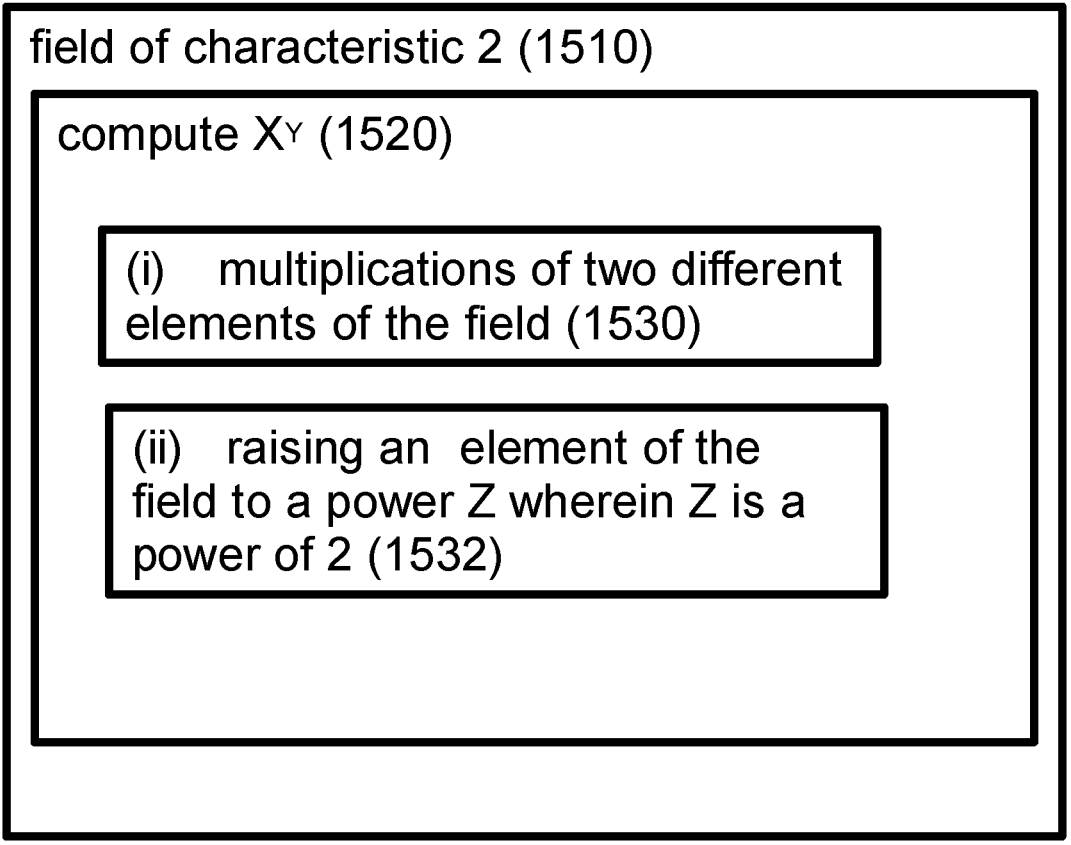
FIG. 15 is a simplified flow diagram of a method according to some exemplary embodiments of the invention.

FIG. 15 is a simplified flow diagram of a method, indicated generally as 1500, according to some exemplary embodiments of the invention. Exemplary advantages associated with the practice of method 1500 include, but are not limited to, a contribution to an improvement in processing speed and/or a contribution to a reduction in surface area of silicon required in the chip performing the data processing.

Depicted exemplary method 1500 includes computing 1520 $X^Y$ in a field of characteristic 2 (1510) by performing a series of: (i) multiplications 1530 of two different elements of the field and (ii) raising 1532 an element of the field to a power Z wherein Z is a power of 2. According to method 1500 the number of multiplications (i) is at least two less than the number of ones (1s) in the binary representation of Y.

As an example of how method 1500 differs from previous practice, if Y=254 the binary representation of Y is 11111110 so there are seven ones and the number of steps (i) will be six (6) in standard computing algorithms According to various exemplary embodiments of method 1500, a number of multiplications (i) is 4 or less (e.g. 3, 2, 1 or 0).

Alternatively or additionally, in some embodiments the field is $ZF(2^8)$ and/or Y=254.

Exemplary Use Scenario

Although it might be argued that fault attacks on the intermediate results are not productive for the attacker because of randomization, there is a real threat of a read-by-write attack on the input. Namely, if the attacker forces a bit of the key (on an input pin) to 0 (or to 1), if the behavior has not changed after forcing the bit to 0, it means that the bit was originally 0; otherwise it was 1.

If a checksum (e.g. CRC32) is added to the key at the input interface (see description of method 1400 above) the number of bits to be supplied increases. For example, instead of 128-bit key 160 bits have to be supplied (128 bits of the key+32 bits of the CRC). The engine verifies the CRC and refuses to work in the case of a mismatch. If a fault changes less than a certain number of bits (this number depends on the key size and the CRC size), then the CRC check is sure to fail; beyond that minimum, the CRC check may pass, but with a negligible probability ($2^{-32}$ in the case of CRC32).

Alternatively or additionally, when raising to the power of 254, method 1500 takes advantage of the fact that squaring (or raising an element of the field to a power Z wherein Z is a power of 2) in a field of characteristic two is a linear operation which can be performed more efficiently than a general multiplication. Instead of the standard way of raising to the power of 254 that requires 7 squarings and 6 general (non-linear) multiplications, method 1500 increases efficiency by using a different sequence with 4 non-linear multiplications only.

There are many such sequences, e.g.:

| Calculation A | Type | Calculation B | Type |
|---|---|---|---|
| $x^2 = x^2$ | (ii) | $x^8 = x^8$ | (ii) |
| $x^3 = x^2 \cdot x$ | (i) | $x^9 = x^8 \cdot x$ | (i) |
| $x^6 = (x^3)^2$ | (ii) | $x^{36} = (x^9)^4$ | (ii) |
| $x^7 = x^6 \cdot x$ | (i) | $x^{45} = x^{36} \cdot x^9$ | (i) |
| $x^{14} = (x^7)^2$ | (ii) | $x^{90} = (x^{45})^2$ | (ii) |
| $x^{15} = x^{14} \cdot x$ | (i) | $x^{91} = x^{90} \cdot x$ | (i) |
| $x^{120} = (x^{15})^8$ | (ii) | $x^{127} = x^{91} \cdot x^{36}$ | (i) |
| $x^{127} = x^{120} \cdot x^7$ | (i) | $x^{254} = (x^{127})^2$ | (ii) |
| $x^{254} = (x^{127})^2$ | (ii) | | |

Calculation A requires 4 non-linear multiplications (type (i)), four squarings (type(ii)), and one raising to the power of 8 (also type (ii)).

Calculation B requires 4 non-linear multiplications (type (i)) and 4 type (ii) operations.

The following code provides an exemplary way to generate additional calculations for any desired Galois field of characteristic two and for any Y:

```
import itertools as iter, collections as col
def FindOptimalPath(degree,power,upto=0):
    ...
Find optimal (with the minimal number of multiplications) ways to calculate κ^power in the field ZF(2^degree).
The maximal returned number of ways is upto, unless upto = =0 in which case all the optimal ways are returned.
For every way a multi-line string is returned. The first line always contains the set of powers that can be
reached from 1 by doublings only (powers of 2). Every line, starting from the second one, contains:
* the first addend (always the first element of the set at the previous line)
* the second addend (an element of one of the sets at previous lines)
* their sum modulo (1 < < degree)-1 (the order of the multiplicative group of ZF(2^degree))
* the set of powers reachable from the sum by doublings only
    ...
    limit = (1 < < degree)-1
    index, eqClasses = { }, { } #index[i] = the equivalence class to which i belongs
    for i in range(1, limit):
        if i in index:
            continue
        j = i
        eqClass = [ ]
        while j not in index:
            eqClass.append(j)
            index[j] = i
            j = (2 * j) % limit
        eqClasses[i] = tuple(eqClass)
Group=col.namedtuple('Group','lst,verbose')
groups = [(Group(lst=(1,),verbose='   \t%s\n'%str(eqClasses[1]))}]
res = [ ]
while True:
    groups.append(set( ))
    for group in groups[-2]:
        c0=eqClasses[group.lst[-1]][0]
        for i in group.lst:
            for c1 in eqClasses[i]:
                c2 = (c0+c1)%limit
                if c2= =0:
                    continue
                if index[c2] in group[0]:
                    continue
                lst, verbose = tuple(list(group.lst)+[index[c2]]),
roup.verbose+'%6d%6d%6d\t%s\n'%(c0,c1,c2,eqClasses[index[c2]])
                groups[-1].add(Group(lst = lst, verbose = verbose))
                if index[c2] = = index[power]:
                    res.append(verbose)
                    if len(res) = = upto:
                        return res
    if len(res):
        return res
```

Additional Exemplary Method

Figure 16:
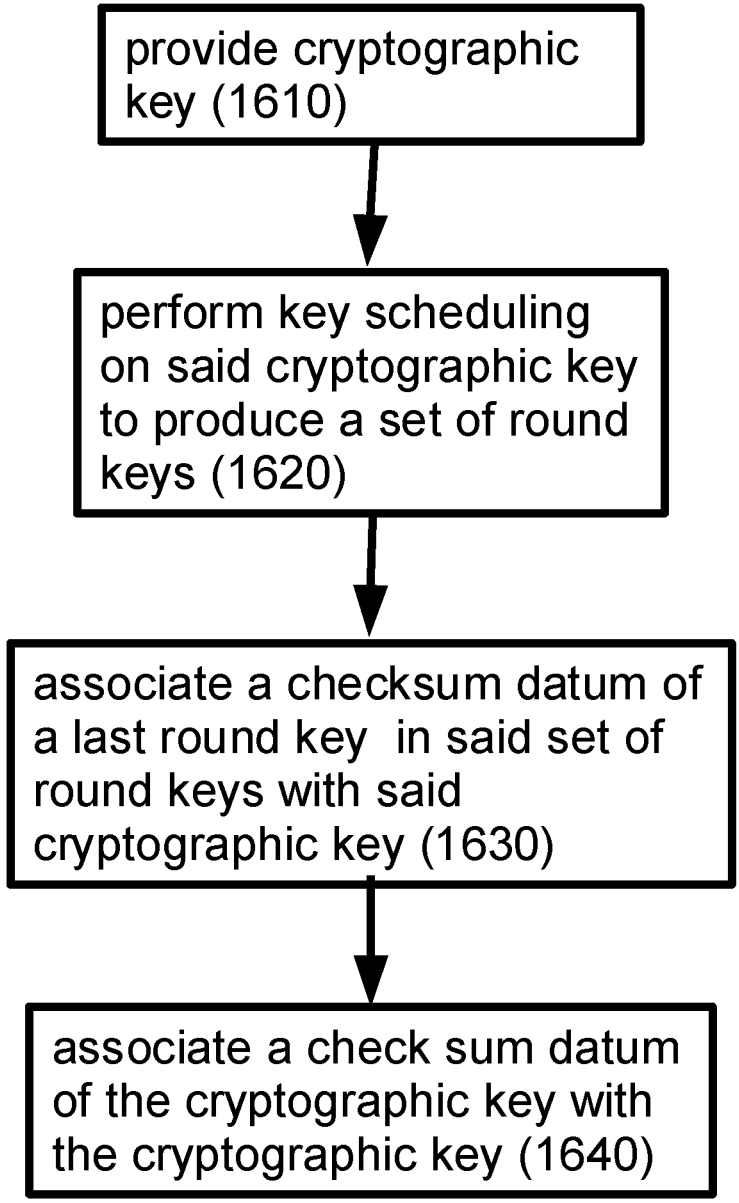
FIG. 16 is a simplified flow diagram of a method according to some exemplary embodiments of the invention.

FIG. 16 is a simplified flow diagram of a method, indicated generally as 1600, according to some exemplary embodiments of the invention. Implementation of method 1600, like method 1400, contributes to a reduction in susceptibility to fault injection attacks. Depicted exemplary method 1600 includes providing 1610 a cryptographic key and performing 1620 key scheduling on the cryptographic key to produce a set of round keys. In the depicted embodiment, method 1600 includes associating 1630 a checksum datum of a last round key in said set of round keys with the cryptographic key. In some exemplary embodiments of method 1600, the method includes associating a check sum datum of the cryptographic key with the cryptographic key as in method 1400.

Exemplary Advantages

Some embodiments of methods 200 and/or 300 and/or 400 and/or 800 contribute to accuracy of an estimation of an ability of a chip to resist SCA prior to manufacturing the chip. According to various embodiments the attacks include SPA and/or DPA and/or electromagnetic attacks (EMA) and/or fault injection attacks.

Some embodiments of method 500 contribute to accuracy of an estimation of an ability of a chip to resist fault injection attacks prior to manufacturing the chip.

Some embodiments of IP core 600 and/or 1000 and/or 1200 and/or method 700 and/or 1100 and/or 1300 contribute to an increase in robustness of encryption.

Alternatively or additionally, some embodiments of IP cores 600 and/or 1000 and/or 1200 contribute an ability of a manufactured chip to resist various types of SCA.

Alternatively or additionally, implementation of IP core 1200 and/or method 1300 is possible in the context of SM4 block cipher.

Some embodiments of method 900 contribute to an ability of a population of manufactured chips to resist various types of SCA and reverse engineering.

In some embodiments combination of additive and redundancy masking contributes to a reduction in information leakage while masking by applying a second mask before removing the first mask so that at least one mask is always in place.

Alternatively or additionally, implementation of method 1500 contributes to an increase in calculation speed and/or a reduction in the amount of silicon surface area required in the data processing chip.

Alternatively or additionally, implementation of methods 1400 and/or 1600 contributes to a reduction in susceptibility to fault injection attacks.

It is expected that during the life of this patent, many new block cipher algorithms will be developed, and the scope of the invention is intended to include all such new technologies a priori.

Although the invention has been described in conjunction with specific embodiments thereof, it is evident that many alternatives, modifications and variations will be apparent to those skilled in the art. Accordingly, the invention embraces all such alternatives, modifications and variations that fall within scope of the appended claims and/or this specification.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and do not limit the scope of the invention, which is defined solely by the following claims.

Each recitation of an embodiment of the invention that includes a specific feature, part, component, module or process is an explicit statement that additional embodiments of the invention not including the recited feature, part, component, module or process exist.

Alternatively or additionally, various exemplary embodiments of the invention exclude any specific feature, part, component, module, process or element which is not specifically disclosed herein.

Specifically, the invention has been described in the context of block ciphers but might also be used in other cryptography scenarios.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

The invention claimed is:

1. A method of improving performance of a data processor implemented by circuitry comprising:
   in a field of characteristic 2 computing $X^Y$ by performing a series of:
   (i) multiplications of two different elements of the field; and
   (ii) raising an element of the field to a power Z wherein Z is a power of 2;
   wherein a number of multiplications (i) is at least two less than a number of ones (1s) in a binary representation of Y.

2. The method according to claim 1, wherein the field is ZF ($2^8$).

3. The method according to claim 1, wherein Y=254.

4. The method according to claim 3, wherein number of multiplications (i) is 4 or less.

* * * * *